United States Patent
Choi et al.

(10) Patent No.: US 12,167,024 B2
(45) Date of Patent: Dec. 10, 2024

(54) SYSTEMS AND METHODS FOR PERFORMING MOTION VECTOR PREDICTION FOR VIDEO CODING USING MOTION VECTOR PREDICTOR ORIGINS

(71) Applicant: Sharp Kabushiki Kaisha, Sakai (JP)

(72) Inventors: Byeongdoo Choi, Vancouver, WA (US); Kiran Mukesh Misra, Vancouver, WA (US); Jie Zhao, Vancouver, WA (US); Philip Cowan, Vancouver, WA (US); Weijia Zhu, Vancouver, WA (US); Sachin G. Deshpande, Vancouver, WA (US); Frank Bossen, Vancouver, WA (US); Christopher Andrew Segall, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/555,588

(22) Filed: Dec. 20, 2021

(65) Prior Publication Data
US 2022/0116646 A1 Apr. 14, 2022

Related U.S. Application Data

(63) Continuation of application No. 16/965,609, filed as application No. PCT/JP2019/002164 on Jan. 24, 2019, now Pat. No. 11,240,528.

(60) Provisional application No. 62/625,885, filed on Feb. 2, 2018, provisional application No. 62/624,005, filed on Jan. 30, 2018.

(51) Int. Cl.
H04N 19/52 (2014.01)
H04N 19/176 (2014.01)
H04N 19/70 (2014.01)

(52) U.S. Cl.
CPC .......... *H04N 19/52* (2014.11); *H04N 19/176* (2014.11); *H04N 19/70* (2014.11)

(58) Field of Classification Search
CPC ....... H04N 19/176; H04N 19/52; H04N 19/70
See application file for complete search history.

(56) References Cited

U.S. PATENT DOCUMENTS

| | | | | |
|---|---|---|---|---|
| 2013/0003851 A1* | 1/2013 | Yu | ......... | H04N 19/577 |
| | | | | 375/E7.125 |
| 2013/0070855 A1* | 3/2013 | Zheng | .......... | H04N 19/52 |
| | | | | 375/E7.125 |
| 2013/0101033 A1* | 4/2013 | Joshi | .......... | H03M 7/3068 |
| | | | | 375/240.12 |
| 2014/0205014 A1* | 7/2014 | Nakamura | .......... | H04N 19/521 |
| | | | | 375/240.16 |
| 2014/0321547 A1* | 10/2014 | Takehara | .......... | H04N 19/159 |
| | | | | 375/240.16 |
| 2014/0355688 A1* | 12/2014 | Lim | .......... | H04N 19/52 |
| | | | | 375/240.16 |

(Continued)

*Primary Examiner* — Anner N Holder
(74) *Attorney, Agent, or Firm* — Keating & Bennett, LLP

(57) ABSTRACT

Systems and methods for performing motion vector prediction for video coding are disclosed. A motion vector predictor is determined based at least in part on motion information associated with a selected motion vector predictor origin and offset values corresponding to a selected sampling point. The sampling point is specified according to a set of direction and distance on a sampling map for the motion vector predictor origin.

2 Claims, 14 Drawing Sheets

(56) References Cited

U.S. PATENT DOCUMENTS

| | | | |
|---|---|---|---|
| 2018/0070100 A1* | 3/2018 | Chen | H04N 19/174 |
| 2018/0084260 A1* | 3/2018 | Chien | H04N 19/52 |
| 2018/0130217 A1* | 5/2018 | Ray | G06T 7/37 |
| 2018/0359470 A1* | 12/2018 | Lee | H04N 19/198 |
| 2019/0174136 A1* | 6/2019 | Jun | H04N 19/13 |
| 2019/0200040 A1* | 6/2019 | Lim | H04N 19/96 |
| 2019/0246103 A1* | 8/2019 | Jun | H04N 19/513 |

* cited by examiner

SYSTEMS AND METHODS FOR PERFORMING MOTION VECTOR PREDICTION FOR VIDEO CODING USING MOTION VECTOR PREDICTOR ORIGINS

CROSS REFERENCE

This Nonprovisional application claims priority under 35 U.S.C. § 119 on provisional Application No. 62/624,005 on Jan. 30, 2018, No. 62/625,825 on Feb. 2, 2018, the entire contents of which are hereby incorporated by reference.

TECHNICAL FIELD

This disclosure relates to video coding and more particularly to techniques for performing motion vector prediction.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that are under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream.

SUMMARY OF INVENTION

In one example, a method of reconstructing video data, comprising determining a selected motion vector predictor origin for a current video block, determining a sampling map for the motion vector predictor origin, deriving offset values corresponding to sampling points on the sampling map, determining a selected sampling point, determining a motion vector predictor based at least in part on motion information associated with the selected motion vector predictor origin and the offset values corresponding to the selected sampling point, and generating a prediction for the current video block using the determined motion vector predictor.

In one example, a method of encoding video data, comprises selecting a motion vector predictor origin for a current video block, selecting a sampling map for the motion vector predictor origin, deriving offset values corresponding to sampling points on the sampling map, selecting a sampling point, and signaling the selected motion vector predictor origin, the selected sampling map, and the selected sampling point motion vector predictor.

DESCRIPTION OF EMBODIMENTS

Figure 1:
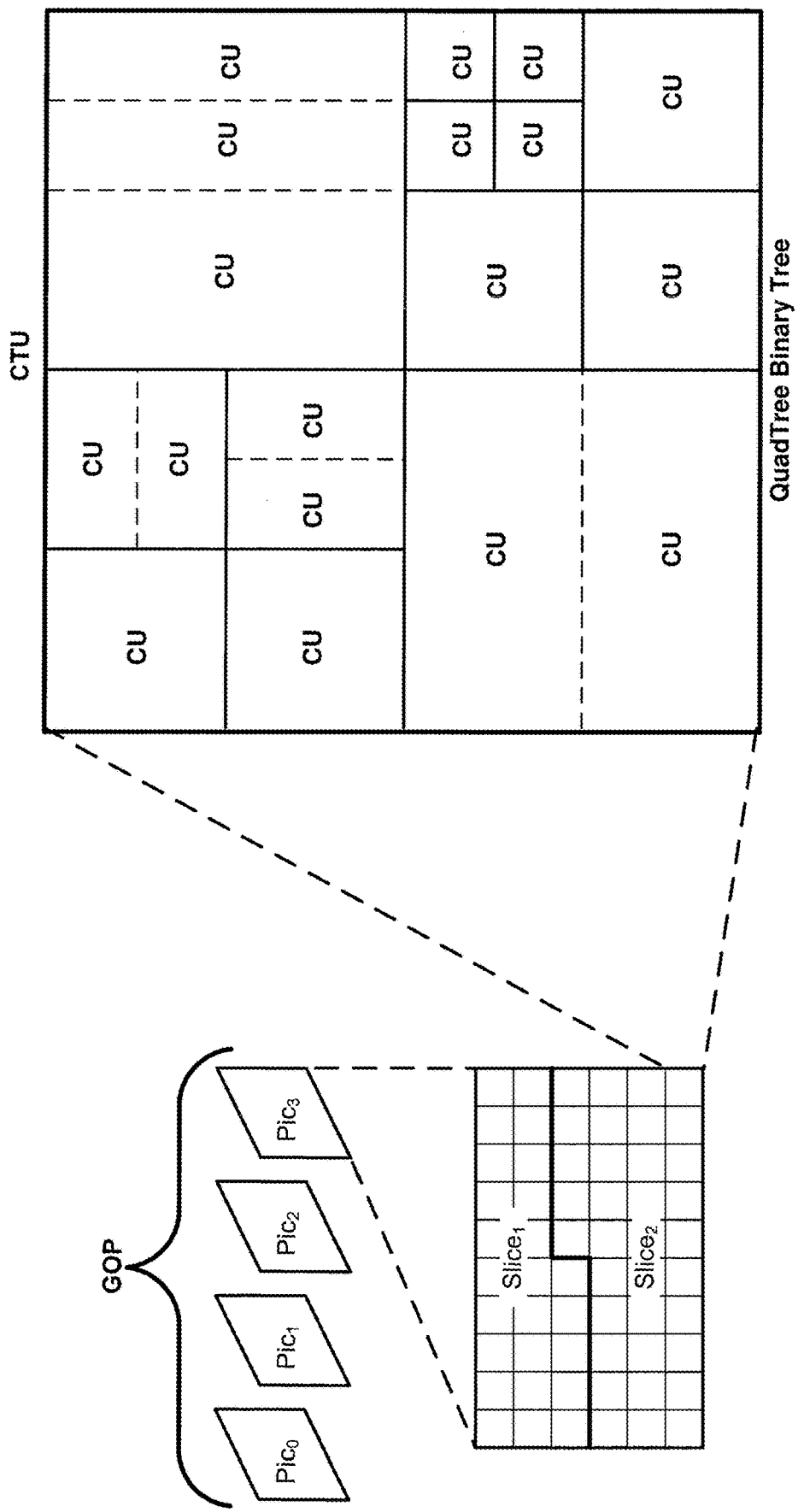
FIG. 1 is a conceptual diagram illustrating an example of a group of pictures coded according to a quad tree binary tree partitioning in accordance with one or more techniques of this disclosure.

In general, this disclosure describes various techniques for coding video data. In particular, this disclosure describes techniques for motion vector prediction. It should be noted that although techniques of this disclosure are described with respect to ITU-T H.264, ITU-T H.265, and JEM, the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265 and JEM. Thus, reference to ITU-T H.264, ITU-T H.265, and/or JEM is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device for reconstructing video data comprises one or more processors configured to determine a selected motion vector predictor origin for a current video block, determine a sampling map for the motion vector predictor origin, derive offset values corresponding to sampling points on the sampling map, determine a selected sampling point, determine a motion vector predictor based at least in part on motion information associated with the selected motion vector predictor origin and the offset values corresponding to the selected sampling point, and generate a prediction for the current video block using the determined motion vector predictor.

In one example, a non-transitory computer-readable storage medium comprises instructions stored thereon that, when executed, cause one or more processors of a device to determine a selected motion vector predictor origin for a current video block, determine a sampling map for the motion vector predictor origin, derive offset values corresponding to sampling points on the sampling map, determine a selected sampling point, determine a motion vector predictor based at least in part on motion information associated with the selected motion vector predictor origin and the offset values corresponding to the selected sampling point, and generate a prediction for the current video block using the determined motion vector predictor.

In one example, an apparatus comprises means for determining a selected motion vector predictor origin for a current video block, means for determining a sampling map for the motion vector predictor origin, means for deriving offset values corresponding to sampling points on the sampling map, means for determining a selected sampling point, means for determining a motion vector predictor based at least in part on motion information associated with the selected motion vector predictor origin and the offset values corresponding to the selected sampling point, and means for generating a prediction for the current video block using the determined motion vector predictor.

In one example, a device for encoding video data comprises one or more processors configured to select a motion vector predictor origin for a current video block, select a sampling map for the motion vector predictor origin, derive offset values corresponding to sampling points on the sampling map, select a sampling point, and signal the selected motion vector predictor origin, the selected sampling map, and the selected sampling point motion vector predictor.

In one example, a non-transitory computer-readable storage medium comprises instructions stored thereon that, when executed, cause one or more processors of a device to select a motion vector predictor origin for a current video block, select a sampling map for the motion vector predictor origin, derive offset values corresponding to sampling points on the sampling map, select a sampling point, and signal the selected motion vector predictor origin, the selected sampling map, and the selected sampling point motion vector predictor In one example, an apparatus comprises means for selecting a motion vector predictor origin for a current video block, means for selecting a sampling map for the motion vector predictor origin, means for deriving offset values corresponding to sampling points on the sampling map, means for selecting a sampling point, and means for signaling the selected motion vector predictor origin, the selected sampling map, and the selected sampling point motion vector predictor.

The details of one or more examples are set forth in the accompanying drawings and the description below. Other features, objects, and advantages will be apparent from the description and drawings, and from the claims.

Video content typically includes video sequences comprised of a series of frames (or pictures). A series of frames may also be referred to as a group of pictures (GOP). Each video frame or picture may include a plurality of slices or tiles, where a slice or tile includes a plurality of video blocks. As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values that may be predictively coded. It should be noted that in some cases pixels values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Video blocks may be ordered within a picture according to a scan pattern (e.g., a raster scan). A video encoder may perform predictive encoding on video blocks and sub-divisions thereof. Video blocks and sub-divisions thereof may be referred to as nodes.

ITU-T H.264 specifies a macroblock including 16×16 luma samples. That is, in ITU-T H.264, a picture is segmented into macroblocks. ITU-T H.265 specifies an analogous Coding Tree Unit (CTU) structure (also referred to as an largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respect luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs (i.e., intra prediction PB types include M×M or M/2×M/2, where M is the height and width of the square CB). In ITU-T H.265, in addition to the square PBs, rectangular PBs are supported for inter prediction, where a CB may by halved vertically or horizontally to form PBs (i.e., inter prediction PB types include M×M, M/2×M/2, M/2×M, or M×M/2). Further, it should be noted that in ITU-T H.265, for inter prediction, four asymmetric PB partitions are supported, where the CB is partitioned into two PBs at one quarter of the height (at the top or the bottom) or width (at the left or the right) of the CB (i.e., asymmetric partitions include M/4×M left, M/4×M right, M×M/4 top, and M×M/4 bottom). Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. FIG. 1 illustrates an example of a CTU (e.g., a CTU having a size of 256×256 luma samples) being partitioned into quadtree leaf nodes and quadtree leaf nodes being further partitioned according to a binary tree. That is, in FIG. 1 dashed lines indicate additional binary tree partitions in a quadtree. Thus, the binary tree structure in JEM enables square and rectangular leaf nodes, where each leaf node includes a CB. As illustrated in FIG. 1, a picture included in a GOP may include slices, where each slice includes a sequence of CTUs and each CTU may be partitioned according to a QTBT structure. FIG. 1 illustrates an example of QTBT partitioning for one CTU included in a slice.

In JEM, a QTBT is signaled by signaling QT split flag and BT split mode syntax elements. Further, in JEM, luma and chroma components may have separate QTBT partitions. That is, in JEM luma and chroma components may be partitioned independently by signaling respective QTBTs. Currently, in JEM independent QTBT structures are enabled for slices using intra prediction techniques. Additionally, it should be noted that JEM includes the following parameters for signaling of a QTBT tree:

CTU size: the root node size of a quadtree (e.g., 256×256, 128×128, 64×64, 32×32, 16×16 luma samples);

MinQTSize: the minimum allowed quadtree leaf node size (e.g., 16×16, 8×8 luma samples);

MaxBTSize: the maximum allowed binary tree root node size, i.e., the maximum size of a leaf quadtree node that may be partitioned by binary splitting (e.g., 64×64 luma samples);

MaxBTDepth: the maximum allowed binary tree depth, i.e., the lowest level at which binary splitting may occur, where the quadtree leaf node is the root (e.g., 3);

MinBTSize: the minimum allowed binary tree leaf node size; i.e., the minimum width or height of a binary leaf node (e.g., 4 luma samples).

It should be noted that in some examples, MinQTSize, MaxBTSize, MaxBTDepth, and/or MinBTSize may be different for the different components of video. In JEM, CBs are used for prediction without any further partitioning. That is, in JEM, a CB may be a block of sample values on which the same prediction is applied. Thus, a JEM QTBT leaf node may be analogous a PB in ITU-T H.265.

Figure 2:
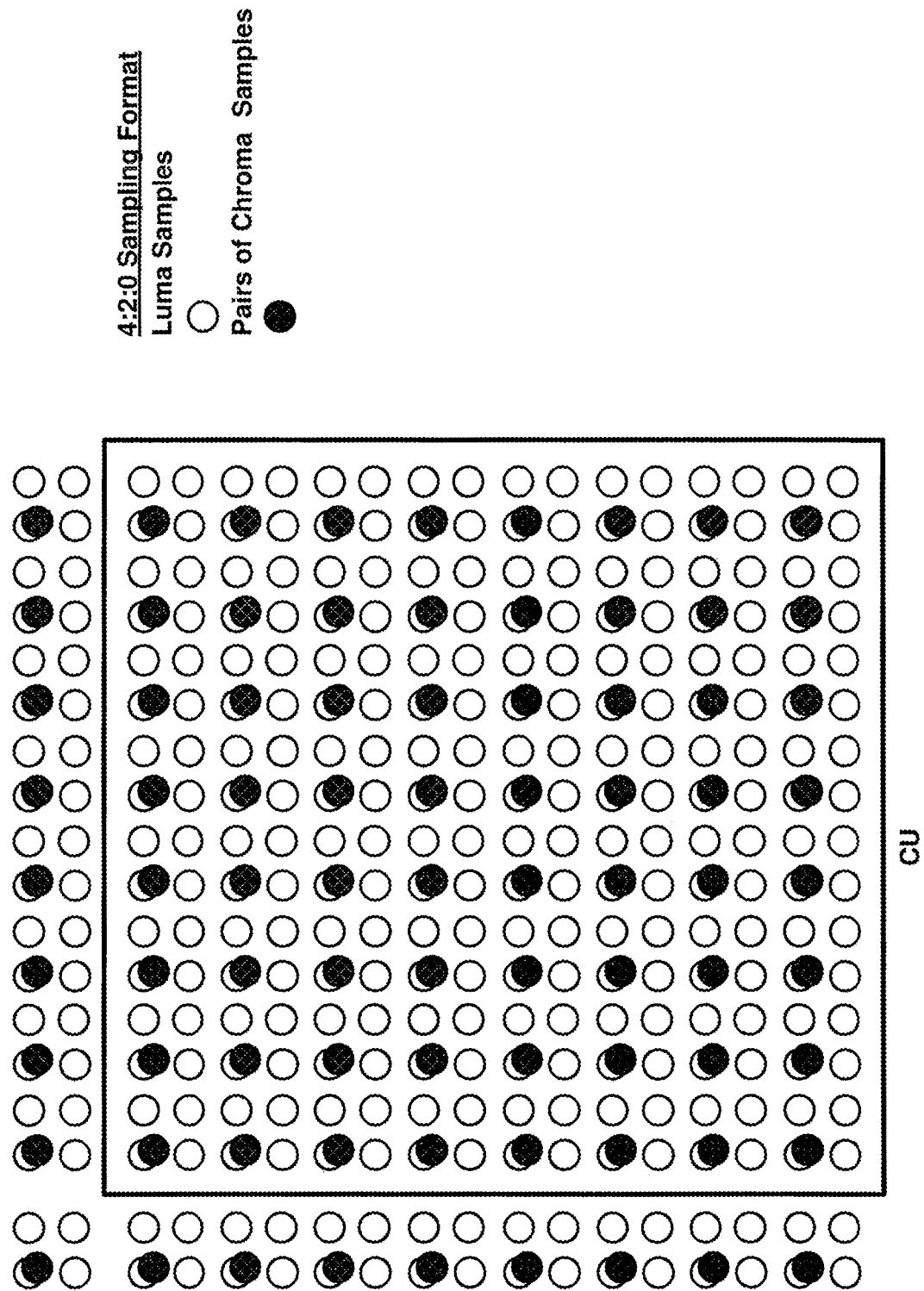
FIG. 2 is a conceptual diagram illustrating an example of a video component sampling format in accordance with one or more techniques of this disclosure.

A video sampling format, which may also be referred to as a chroma format, may define the number of chroma samples included in a CU with respect to the number of luma samples included in a CU. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 2 is a conceptual diagram illustrating an example of a coding unit formatted according to a 4:2:0 sample format. FIG. 2 illustrates the relative position of chroma samples with respect to luma samples within a CU. As described above, a CU is typically defined according to the number of horizontal and vertical luma samples. Thus, as illustrated in FIG. 2, a 16×16 CU formatted according to the 4:2:0 sample format includes 16×16 samples of luma components and 8×8 samples for each chroma component. Further, in the example illustrated in FIG. 2, the relative position of chroma samples with respect to luma samples for video blocks neighboring the 16×16 CU are illustrated. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component.

Figure 3:
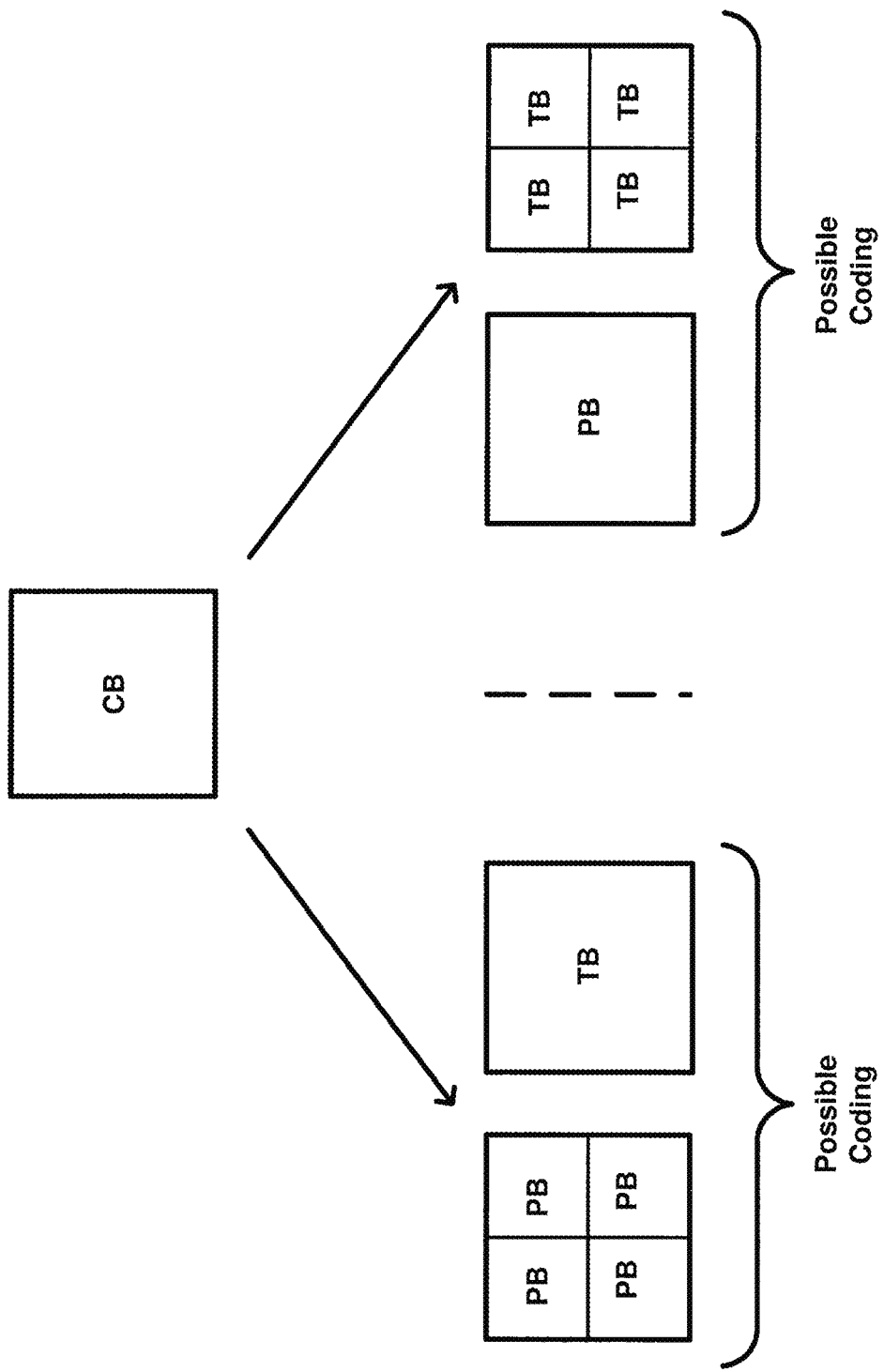
FIG. 3 is a conceptual diagram illustrating possible coding structures for a block of video data in accordance with one or more techniques of this disclosure.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265, a CU is associated with a transform unit (TU) structure having its root at the CU level. That is, in ITU-T H.265, an array of difference values may be sub-divided for purposes of generating transform coefficients (e.g., four 8×8 transforms may be applied to a 16×16 array of residual values). For each component of video data, such sub-divisions of difference values may be referred to as Transform Blocks (TBs). It should be noted that in ITU-T H.265, TBs are not necessarily aligned with PBs. FIG. 3 illustrates examples of alternative PB and TB combinations that may be used for coding a particular CB. Further, it should be noted that in ITU-T H.265, TBs may have the following sizes 4×4, 8×8, 16×16, and 32×32. In JEM, residual values corresponding to a CB are used to generate transform coefficients without further partitioning. That is, in JEM a QTBT leaf node may be analogous to both a PB and a TB in ITU-T H.265. It should be noted that in JEM, a core transform and a subsequent secondary transforms may be applied (in the video encoder) to generate transform coefficients. For a video decoder, the order of transforms is reversed. Further, in JEM, whether a secondary transform is applied to generate transform coefficients may be dependent on a prediction mode.

A quantization process may be performed on transform coefficients. Quantization essentially scales transform coefficients in order to vary the amount of data required to represent a group of transform coefficients. Quantization may include division of transform coefficients by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases.

Figure 4A:
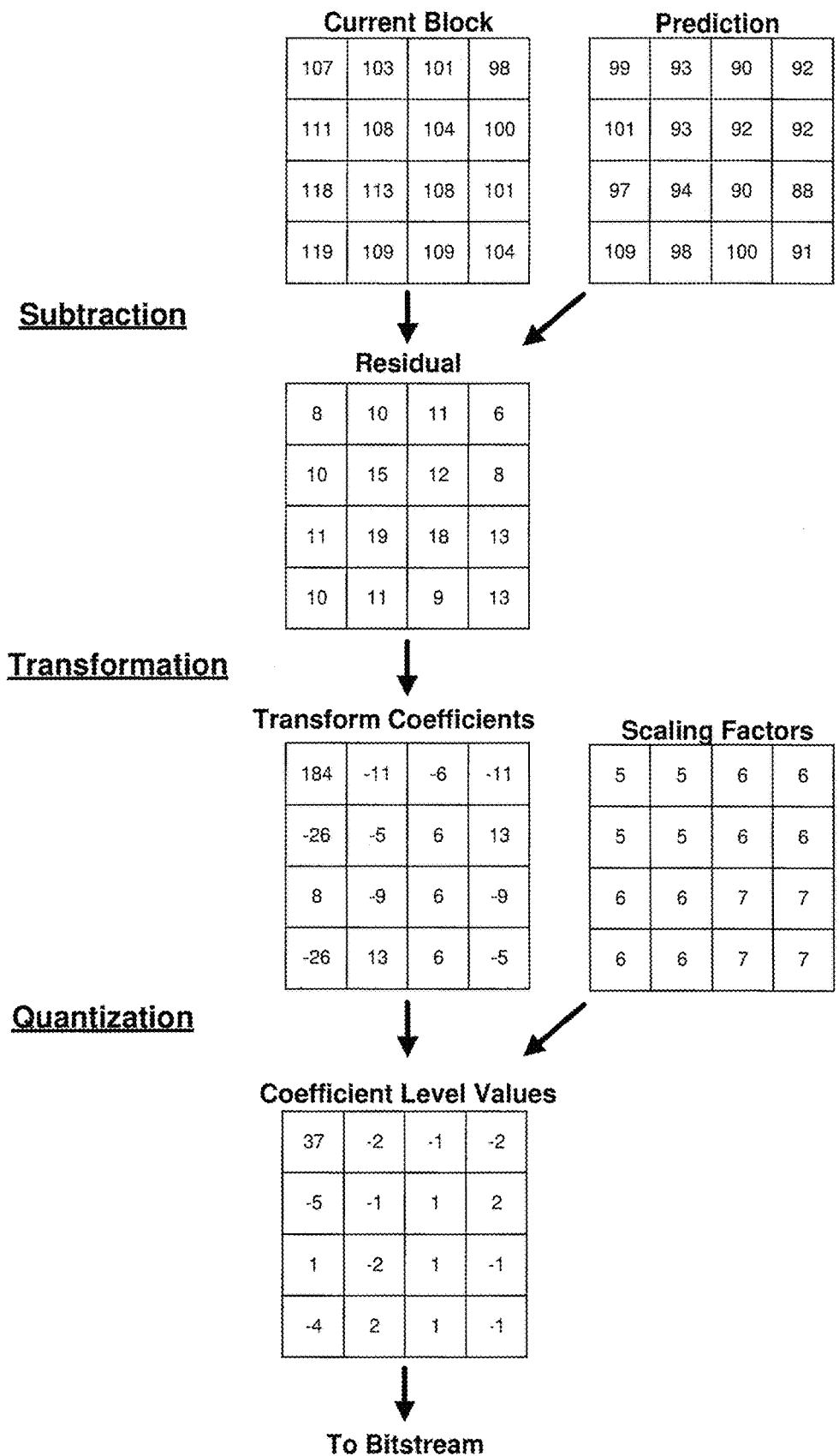
FIG. 4A is a conceptual diagrams illustrating examples of coding a block of video data in accordance with one or more techniques of this disclosure.
Figure 4B:
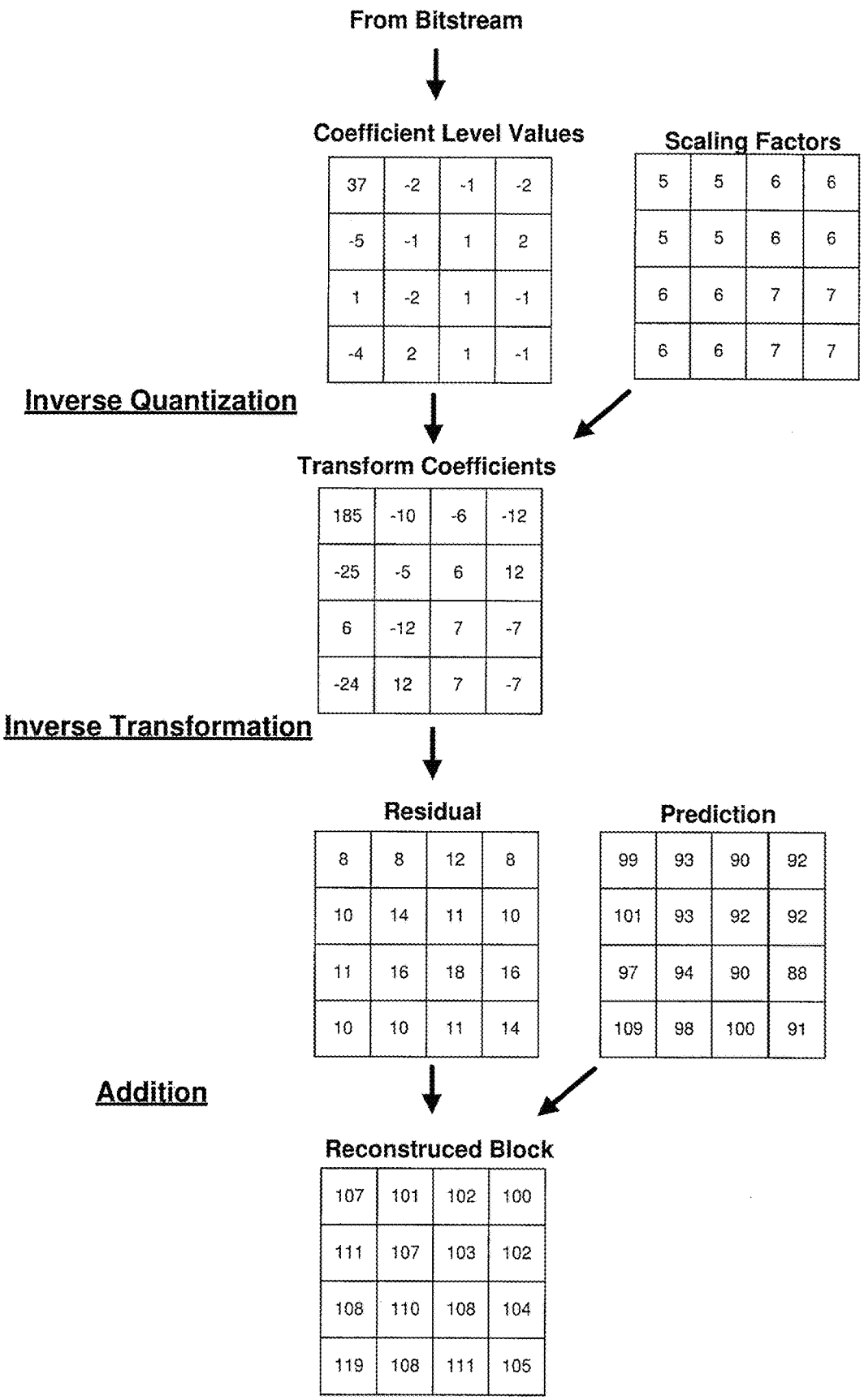
FIG. 4B is a conceptual diagrams illustrating examples of coding a block of video data in accordance with one or more techniques of this disclosure.

FIGS. 4A-4B are conceptual diagrams illustrating examples of coding a block of video data. As illustrated in FIG. 4A, a current block of video data (e.g., a CB corresponding to a video component) is encoded by generating a residual by subtracting a set of prediction values from the current block of video data, performing a transformation on the residual, and quantizing the transform coefficients to generate level values. As illustrated in FIG. 4B, the current block of video data is decoded by performing inverse quantization on level values, performing an inverse transform, and adding a set of prediction values to the resulting residual. It should be noted that in the examples in FIGS. 4A-4B, the sample values of the reconstructed block differs from the sample values of the current video block that is encoded. In this manner, coding may said to be lossy. However, the difference in sample values may be considered acceptable or imperceptible to a viewer of the reconstructed video. Further, as illustrated in FIGS. 4A-4B, scaling is performed using an array of scaling factors.

As illustrated in FIG. 4A, quantized transform coefficients are coded into a bitstream. Quantized transform coefficients and syntax elements (e.g., syntax elements indicating a coding structure for a video block) may be entropy coded according to an entropy coding technique. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process may include performing a binarization on syntax elements. Binarization refers to the process of converting a value of a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265. An entropy coding process further includes coding bin values using lossless data compression algorithms. In the example of a CABAC, for a particular bin, a context model may be selected from a set of available context models associated with the bin. In some examples, a context model may be selected based on a previous bin and/or values of previous syntax elements. A context model may identify the probability of a bin having a particular value. For instance, a context model may indicate a 0.7 probability of coding a 0-valued bin and a 0.3 probability of coding a 1-valued bin. It should be noted that in some cases the probability of coding a 0-valued bin and probability of coding a 1-valued bin may not sum to 1. After selecting an available context model, a CABAC entropy encoder may arithmetically code a bin based on the identified context model. The context model may be updated based on the value of a coded bin. The context model may be updated based on an associated variable stored with the context, e.g., adaptation window size, number of bins coded using the context. It should be noted, that according to ITU-T H.265, a CABAC entropy encoder may be implemented, such that some syntax elements may be entropy encoded using arithmetic encoding without the usage of an explicitly assigned context model, such coding may be referred to as bypass coding.

As described above, intra prediction data or inter prediction data may associate an area of a picture (e.g., a PB or a CB) with corresponding reference samples. For intra prediction coding, an intra prediction mode may specify the location of reference samples within a picture. In ITU-T H.265, defined possible intra prediction modes include a planar (i.e., surface fitting) prediction mode (predMode: 0), a DC (i.e., flat overall averaging) prediction mode (pred-Mode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a motion vector (MV) identifies reference samples in a picture other than the picture of a video block to be coded and thereby exploits temporal redundancy in video. For example, a current video block may be predicted from reference block(s) located in previously coded frame(s) and a motion vector may be used to indicate the location of the reference block. A motion vector and associated information may describe, for example, a horizontal component of the motion vector, a vertical component of the motion vector, a resolution for the motion vector (e.g., one-quarter pixel precision, one-half pixel precision, one-pixel precision, two-pixel precision, four-pixel precision), a prediction direction and/or a reference picture index value. Further, a coding standard, such as, for example ITU-T H.265, may support motion vector prediction. Motion vector prediction enables the value of a motion vector to be derived based on another motion vector. Examples of motion vector prediction include advanced motion vector prediction (AMVP), temporal motion vector prediction (TMVP), so-called "merge" mode, and "skip" and "direct" motion inference. Further, JEM supports advanced temporal motion vector prediction (ATMVP) and Spatial-temporal motion vector prediction (STMVP).

ITU-T H.265 supports two modes for motion vector prediction: a merge mode and so-called Advanced Motion Vector Prediction (AMVP). In ITU-T H.265, for both the merge mode and the AMVP for a current PB, a set of candidate blocks is derived. Both a video encoder and video decoder perform the same process to derive a set of candidates. Thus, for a current video block, the same set of candidates is generated during encoding and decoding. A candidate block includes a video block having associated motion information from which motion information used to generate a prediction for a current video block can be derived. For the merge mode in ITU-T H.265, all motion information (i.e., motion vector displacement values, reference picture indices, and reference picture lists) associated with a selected candidate is inherited as the motion information for the current PB. That is, at a video encoder, a candidate block is selected from the derived set of candidates and an index value included in the bitstream indicates the selected candidate and thus, indicates the motion information for the current PB. For AMVP in ITU-T H.265, the motion vector information for the selected candidate is used as a motion vector predictor for the motion vector of the current PB. That is, at a video encoder, a candidate block is selected from the derived set of candidates and an index value indicating the selected candidate and a delta value indicating the difference between the motion vector predictor and the motion vector for the current PB are included in the bitstream.

In ITU-T H.265, a set of candidate blocks may be derived from spatial neighboring blocks, and temporal blocks. Further, generated (or default) motion information may be used for motion vector prediction. Whether motion information used for motion vector prediction of a current PB includes motion information associated with spatial neighboring blocks, motion information associated with temporal blocks, or generated motion information is dependent on the number of candidates to be included in a set, whether temporal motion vector prediction is enabled, the availability of blocks, and/or whether motion information associated with blocks is redundant.

Figure 5:
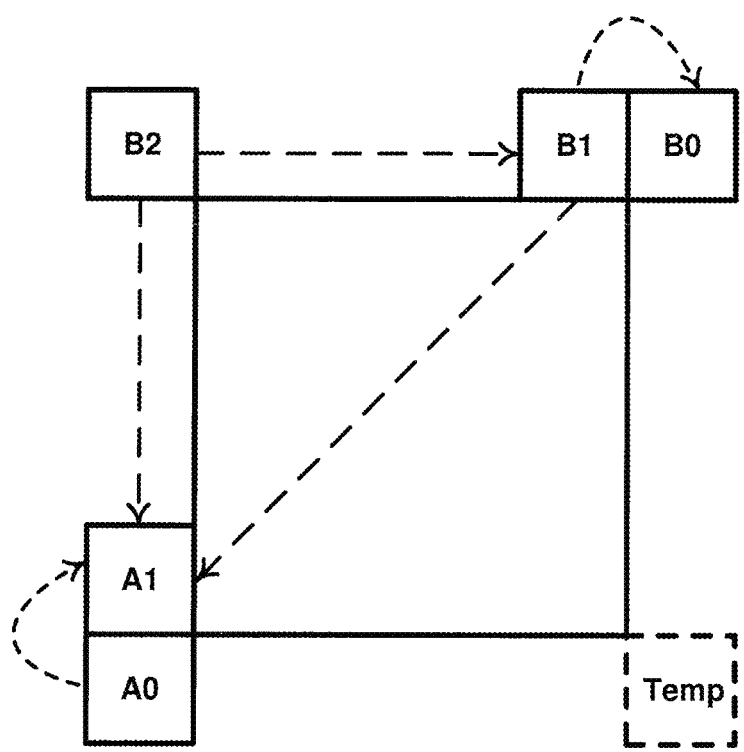
FIG. 5 is a conceptual diagram illustrating the position of neighboring video blocks for inclusion in a set of candidate for motion vector predictors in accordance with one or more techniques of this disclosure.

For the merge mode in ITU-T H.265, a maximum number of candidates that may be included in a set of candidate blocks may be set and signaled by a video encoder and may be up to five. Further, a video encoder may disable the use of temporal motion vector candidates (e.g., in order to reduce the amount memory resources needed to store motion information at a video decoder) and signal whether the use of temporal motion vector candidates is enabled or disabled for a picture. FIG. 5 illustrates the position of spatial neighboring blocks and the temporal block that may be included in a set of candidate blocks for the merge mode in ITU-T H.265. The derivation of the set of candidates for merge mode in ITU-T H.265 includes determining the availability of A1, B1, B0, A0, and B2. It should be noted that a block is considered unavailable, if it is intra-predicted (i.e., does not have corresponding motion information) or is not included in the current slice (or tile). After the determining the availability of A1, B1, B0, A0, and B2, a set of comparisons (illustrated as dashed arrows in FIG. 5) is performed to remove redundant entries from the set of candidates. For example, B2 is compared to B1 and if B1 has associated motion information that is equal to that of B2, it is removed from the set of candidates. The removal of entries from a set of candidates may be referred to as a pruning process. It should be noted that in FIG. 5, in order to reduce complexity, a complete comparison of candidates is not performed (e.g., A0 is not compared to B0) and as such, it is possible that redundant entries are included in the set of candidates.

Referring again to FIG. 5, the dashed block labeled Temp refers to the temporal candidate that may be included in the set of candidates. In ITU-T H.265 for merge mode, for the temporal candidate, a spatially collocated PU included in a reference picture is defined and the temporal candidate includes a block having a position just outside to the bottom right of the collocated PU, if available, or the block at the center position of the collocated PU. As described above, a maximum number of candidates that may be included in a set of candidate blocks is set. If the maximum number of candidates is set to N, N−1 spatial candidates and the temporal candidate are included in the set, in cases where the number of available spatial candidates (after pruning) and temporal candidate is greater than or equal to N. In cases where the number of available spatial candidates (after pruning) and temporal candidate is less than N, generated motion information is included in the set in order to fill the set.

Figure 6:
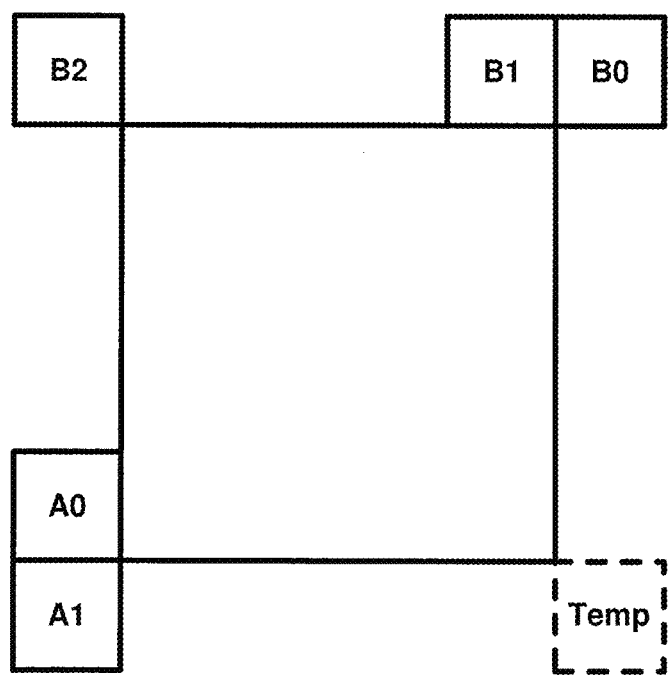
FIG. 6 is a conceptual diagram illustrating the position neighboring video blocks for inclusion in a set of candidate motion vector predictors in accordance with one or more techniques of this disclosure.

For the AMVP in ITU-T H.265, referring to FIG. 6, the derivation of the set of candidates includes adding one of A0 or A1 (i.e., a left candidate) and one of B0, B1 or B2 (an above candidate) to the set based on their availability. That is, the first available left candidate and the first available above candidate are added to the set. When the left candidate and the above candidate have redundant motion vector components, one redundant candidate is removed from the set. If the number of candidates included in the set is less than two, and temporal motion vector prediction is enabled, the temporal candidate (Temp) is included in the set. In cases where the number of available spatial candidates (after pruning) and temporal candidate included in the set is less than two, a zero value motion vector is included in the set in order to fill the set. As described in further detail below, the motion vector prediction techniques in ITU-T H.265 may be less than ideal.

Figure 7:
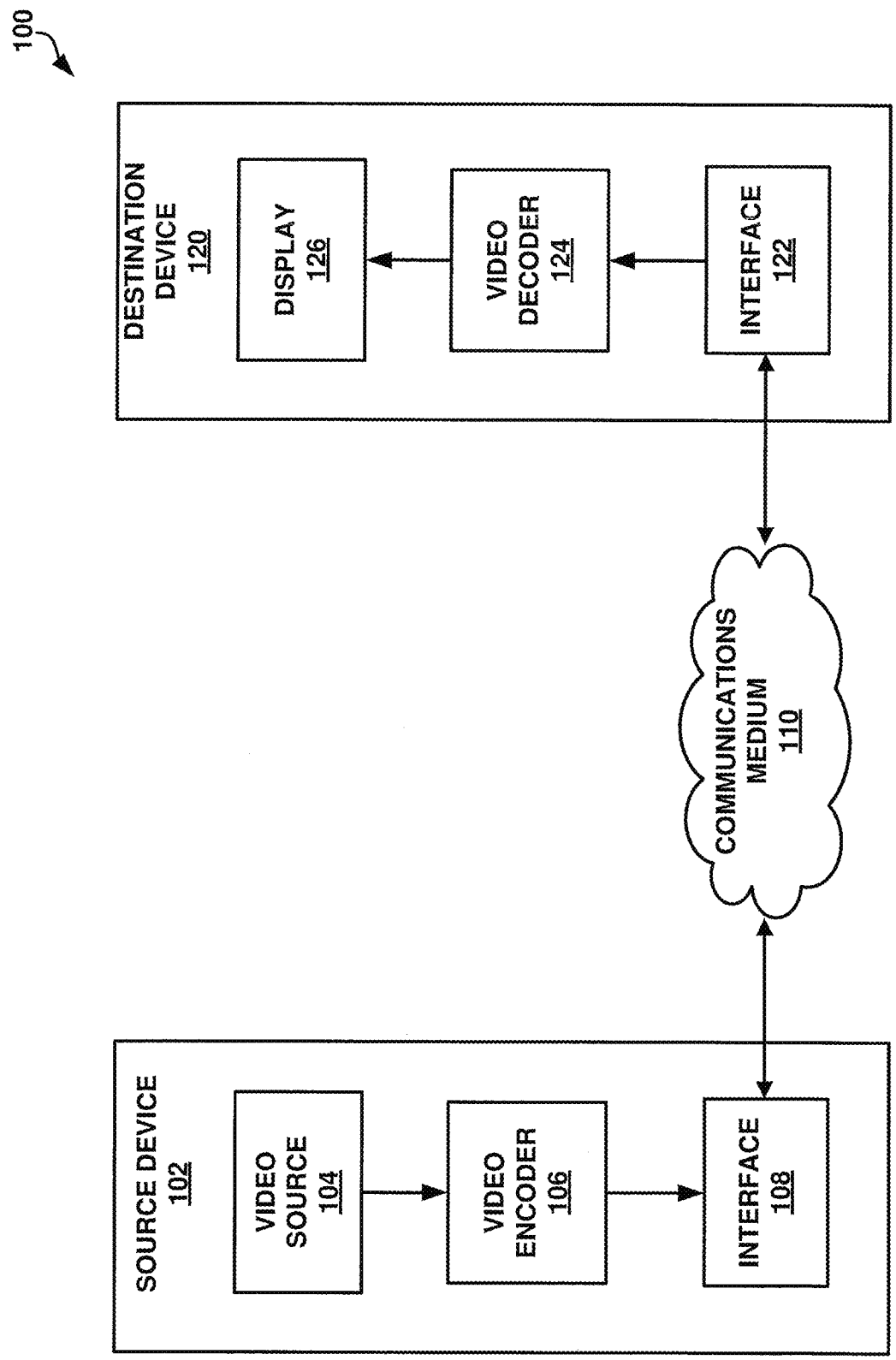
FIG. 7 is a block diagram illustrating an example of a system that may be configured to encode and decode video data according to one or more techniques of this disclosure.

FIG. 7 is a block diagram illustrating an example of a system that may be configured to code (i.e., encode and/or decode) video data according to one or more techniques of this disclosure. System 100 represents an example of a system that may perform video coding using motion vector prediction techniques described according to one or more examples of this disclosure. As illustrated in FIG. 7, system 100 includes source device 102, communications medium 110, and destination device 120. In the example illustrated in FIG. 7, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imaging devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 7, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

Referring again to FIG. 7, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I2C, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 7, video decoder 124 is described as outputting data to display 126, video decoder 124 may be configured to output video data to various types of devices and/or sub-components thereof. For example, video decoder 124 may be configured to output video data to any communication medium, as described herein.

Figure 8:
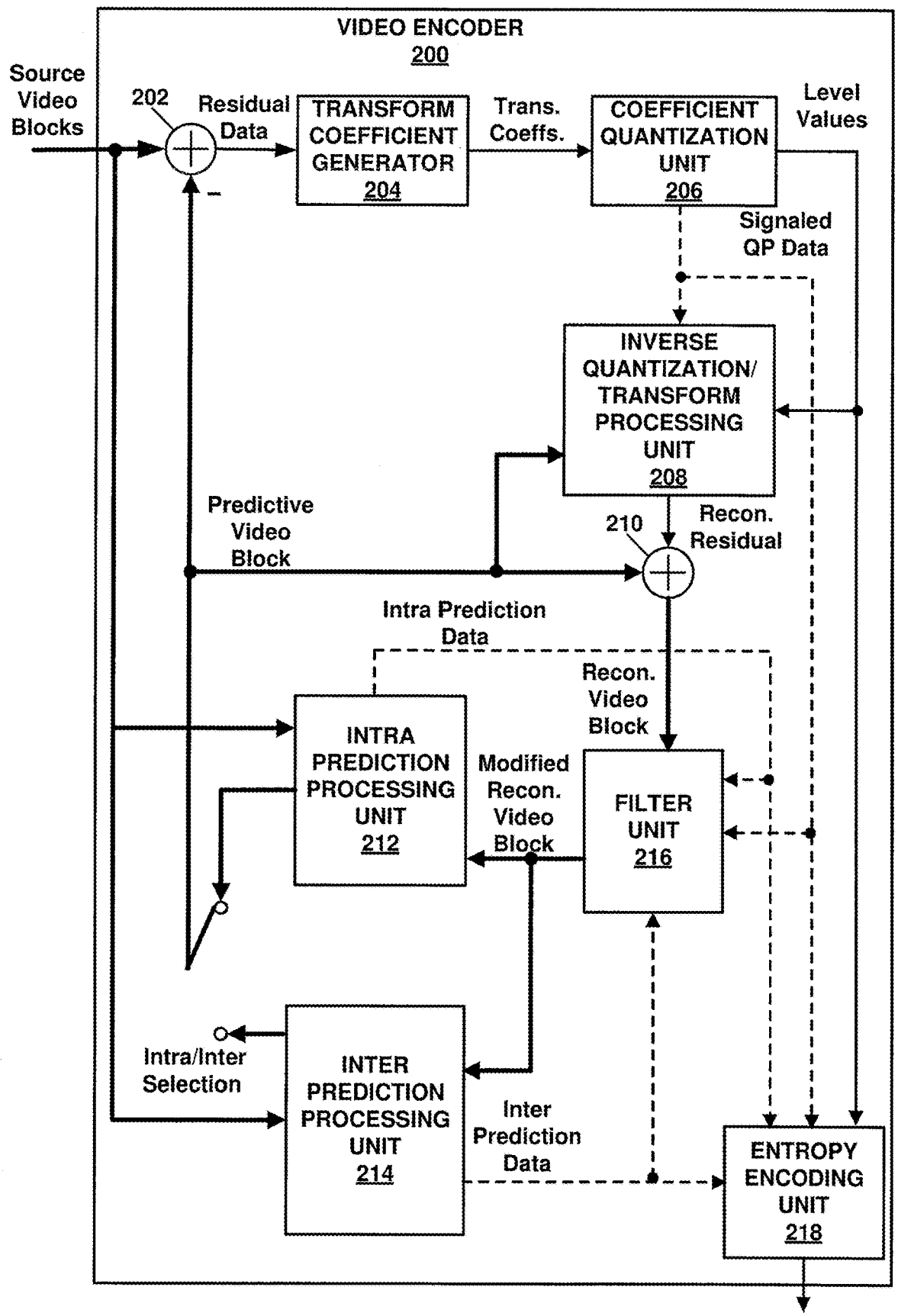
FIG. 8 is a block diagram illustrating an example of a video encoder that may be configured to encode video data according to one or more techniques of this disclosure.

FIG. 8 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 8, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional sub-divisions of source video blocks. It should be noted that some techniques described herein may be generally applicable to video coding, regardless of how source video data is partitioned prior to and/or during encoding. In the example illustrated in FIG. 8, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 8, video encoder 200 receives source video blocks and outputs a bitstream. Video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. Transform coefficient generator 204 may output transform coefficients to coefficient quantization unit 206. Coefficient quantization unit 206 may be configured to perform quantization of the transform coefficients. As described above, the degree of quantization may be modified by adjusting a quantization parameter. Coefficient quantization unit 206 may be further configured to determine quantization parameters (QP) and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

As illustrated in FIG. 8, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 8, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction mode. Intra prediction processing unit 212 may be configured to select an intra prediction mode for a current video block. Intra prediction processing unit 212 may be configured to evaluate a frame and/or an area thereof and determine an intra prediction mode to use to encode a current block. As illustrated in FIG. 8, intra prediction processing unit 212 outputs intra prediction data (e.g., syntax elements) to entropy encoding unit 218 and transform coefficient generator 204. As described above, possible intra prediction modes may include planar prediction modes, DC prediction modes, and angular prediction modes. Inter prediction processing unit 214 may be configured to perform inter prediction coding for a current video block. Inter prediction processing unit 214 may be configured to receive source video blocks and calculate motion information for PUs of a video block. A motion vector may indicate the displacement of a PU (or similar coding structure) of a video block within a current video frame relative to a predictive block within a reference frame. Inter prediction coding may use one or more reference pictures. For example, inter prediction processing unit 214 may locate a predictive video block within a frame buffer (not shown in FIG. 8). It should be noted that inter prediction processing unit 214 may further be configured to apply one or more interpolation filters to a reconstructed residual block to calculate sub-integer pixel values for use in motion estimation. Further, motion prediction may be unipredictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. Inter prediction processing unit 214 may output motion prediction data for a calculated motion vector to entropy encoding unit 218.

Figure 9:
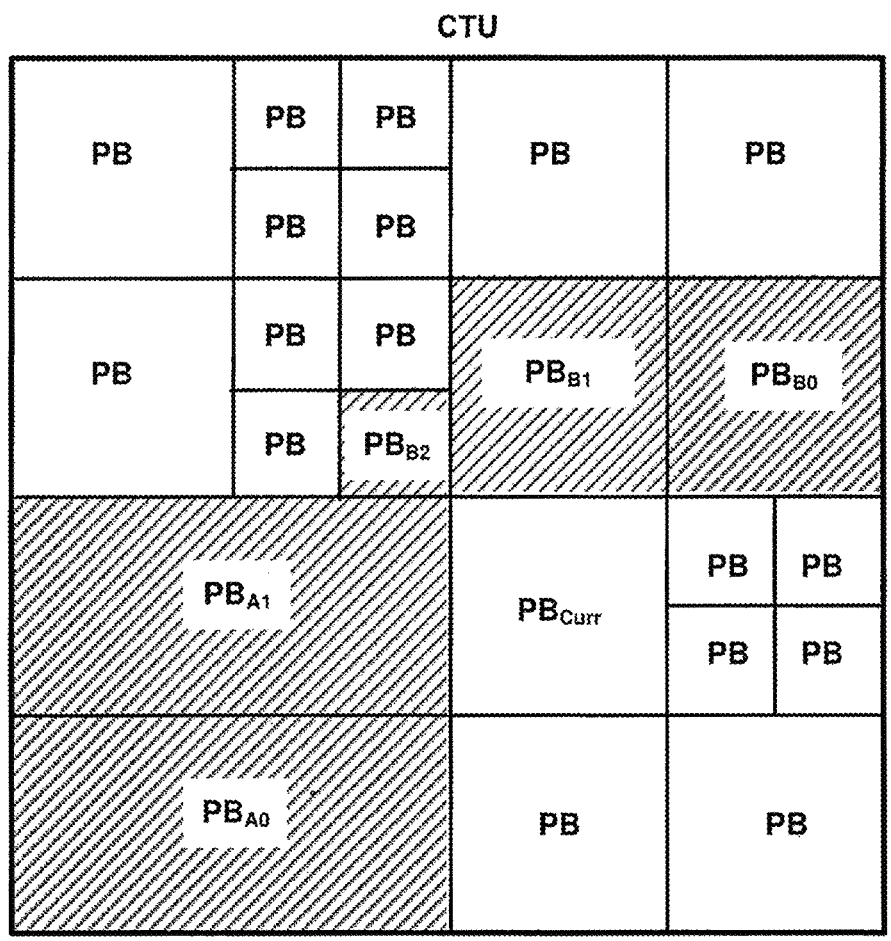
FIG. 9 is a conceptual diagram illustrating the position of neighboring video blocks for inclusion in a set of motion vector predictors in the context of an example video block partitioning according to one or more techniques of this disclosure.

As described above, motion information may be determined and specified according to motion vector prediction techniques. Inter prediction processing unit 214 may be configured to perform motion vector prediction techniques. As described above, the motion vector prediction techniques provided in ITU-T H.265 may be less than ideal. In particular, referring to FIG. 9, FIG. 9 illustrates an example PB partitioning for a CTU and the position of spatial neighboring video blocks (crosshatched PBA0, PBA1, PBB0, PBB1, and PBB0) that may be included in a set of candidates derived according to the derivation process for the merge mode in ITU-T H.265 described above. In some cases, each of PBA0, PBA1, PBB0, PBB1, and PBB0 may have associated motion information that, if selected using the ITU-T H.265 merge mode, results in a low quality prediction for $PB_{Curr}$. In such a case, according to the motion vector prediction techniques provided in ITU-T H.265, it may be more efficient to generate a prediction for $PB_{Curr}$ using motion information that is signaled using a delta value and a motion vector predictor according to the AMVP technique in ITU-T H.265 described above.

Table 1 illustrates the syntax provided in ITU-T H.265 for signaling a delta value in AMVP. It should be noted that in Table 1, the ae(v) descriptor indicates a context-adaptive arithmetic entropy-coded syntax element.

TABLE 1

|  | Descriptor |
|---|---|
| mvd_coding( x0, y0, refList ) { |  |
|   abs_mvd_greater0_flag[ 0 ] | ae(v) |
|   abs_mvd_greater0_flag[ 1 ] | ae(v) |
|   if( abs_mvd_greater0_flag[ 0 ] ) |  |
|     abs_mvd_greater1_flag[ 0 ] | ae(v) |
|   if( abs_mvd_greater0_flag[ 1 ] ) |  |
|     abs_mvd_greater1_flag[ 1 ] | ae(v) |
|   if( abs_mvd_greater0_flag[ 0 ] ){ |  |
|     if( abs_mvd_greater1_flag[ 0 ] ) |  |
|       abs_mvd_minus2 [ 0 ] | ae(v) |
|     mvd_sign_flag[ 0 ] | ae(v) |
|   } |  |
|   if( abs_mvd_greater0_flag[ 1 ] ){ |  |
|     if( abs_mvd_greater1_flag[ 1 ] ) |  |
|       abs_mvd_minus2 [ 1 ] | ae(v) |
|     mvd_sign_flag[ 1 ] | ae(v) |
|   } |  |
| } |  |

ITU-T H.265 provides the following semantics for syntax elements abs_mvd_greater0_flag, abs_mvd_greater1_flag, abs_mvd_minus2_flag, and mvd_sign_flag:

abs_mvd_greater0_flag[compIdx] specifies whether the absolute value of a motion vector component difference is greater than 0.

abs_mvd_greater1_flag[compIdx] specifies whether the absolute value of a motion vector component difference is greater than 1.

When abs_mvd_greater1_flag[compIdx] is not present, it is inferred to be equal to 0.

abs_mvd_minus2[compIdx] plus 2 specifies the absolute value of a motion vector component difference.

When abs_mvd_minus2[compIdx] is not present, it is inferred to be equal to −1.

mvd_sign_flag[compIdx] specifies the sign of a motion vector component difference as follows:

If mvd_sign_flag[compIdx] is equal to 0, the corresponding motion vector component difference has a positive value.

Otherwise (mvd_sign_flag[compIdx] is equal to 1), the corresponding motion vector component difference has a negative value.

When mvd_sign_flag[compIdx] is not present, it is inferred to be equal to 0.

As described above, binarization refers to the process of converting a value of a syntax value into a series of one or more bits and various coding techniques may be used for binarization. Table 2 the binarization provided in ITU-T H.265 for syntax elements abs_mvd_greater0_flag, abs_mvd_greater1_flag, abs_mvd_minus2_flag, and mvd_sign_flag.

TABLE 2

| Syntax Structure | Syntax element | Binarization | |
|---|---|---|---|
|  |  | Process | Input parameter |
| mvd_coding( ) | abs_mvd_greater0_flag[ ] | Fixed Length | cMax = 1 |
|  | abs_mvd_greater1_flag[ ] | Fixed Length | cMax = 1 |
|  | abs_mvd_minus2[ ] | 1$^{st}$ order Exp-Golomb | — |
|  | mvd_sign_flag[ ] | Fixed Length | cMax = 1 |

With respect to Table 2, ITU-T H.265 provides the following description of a Fixed Length (FL) binarization:

FL binarization is constructed by using the fixedLength-bit unsigned integer bin string of the symbol value symbolVal, where fixedLength=Ceil(Log 2(cMax+1)). The indexing of bins for the FL binarization is such that the binIdx=0 relates to the most significant bit with increasing values of binIdx towards the least significant bit.

Further, with respect to Table 2, ITU-T H.265 provides the following description of a k-th order Exp-Golomb (EGk) binarization:

The bin string of the EGk binarization process for each value symbolVal is specified as follows, where each call of the function put(X), with X being equal to 0 or 1, adds the binary value X at the end of the bin string:

```
absV = Abs( symbolVal )
stopLoop = 0
do
    if( absV >= ( 1 << k ) ) {
        put( 1 )
        absV = absV − ( 1 << k )
        k++
    } else {
        put( 0 )
        while( k− − )
        put( ( absV >> k ) & 1 )
        stopLoop = 1
    }
while( !stopLoop )
```

In some cases, delta signaling provided in AMVP may be inefficient. That is, for example, signaling of a delta value greater than two requires a bit for each of abs_mvd_greater0_flag, abs_mvd_greater1_flag. Thus, according to the techniques described herein, it may be useful to provide a mechanism for video encoder 200 to increase the ways in which associated motion information associated with motion vector predictor candidates may be used for motion vector prediction. It should be noted that techniques described herein may be used independent of and/or in combination with other motion vector prediction techniques. For example, in some implementations video encoder 200 may enable or disable various motion vector prediction techniques.

According to the techniques described herein, video encoder 200 may be configured to derive a candidate set of motion vector predictor origins and corresponding sampling maps. A motion vector origin provides associated motion information and serves as an origin for directions and distances of a sampling map. Thus, in some examples a motion vector origin may include a video block having associated motion information from which motion information used to generate a prediction for a current video block can be derived and thus, may be analogous to a candidate block. A sampling map serves to identify sampling points having corresponding offset values. Offset values may be used to modify the motion information associated with a video block at the origin. The modified motion information may be used to generate a prediction. For example, the modified motion information may be inherited by a current PB to generate a prediction. In one example, according to the techniques described herein, similar to deriving a set of candidates, as described above, both a video encoder and video decoder perform the same process to derive a candidate set of motion vector predictor origins. Thus, in some examples a candidate block, derived according to the techniques described above, may be used as a motion vector origin. In other examples, different techniques may be used to derive a set of motion vector predictor origins. For example, a set of motion vector prediction origins may include video blocks located at greater spatial and/or temporal distances from a current block than those derived according to the techniques described above. In one example, as described in further detail below, video encoder 200 may be configured to signal sampling maps corresponding to motion vector predictor origins and signal a sampling point. Thus, the processes of signaling sampling maps and signaling a sampling point may be interrelated and interchanged in some cases. For example, in some cases, video encoder 200 may evaluate all of the possible sampling maps that are enabled be signaled (i.e., according to the bitstream syntax), select a resulting motion vector predictor that can be signaled using the possible sampling maps (e.g., the best motion vector predictor), and select one of the possible sampling maps and corresponding sample point that enable the selected motion to be identified.

Figure 10:
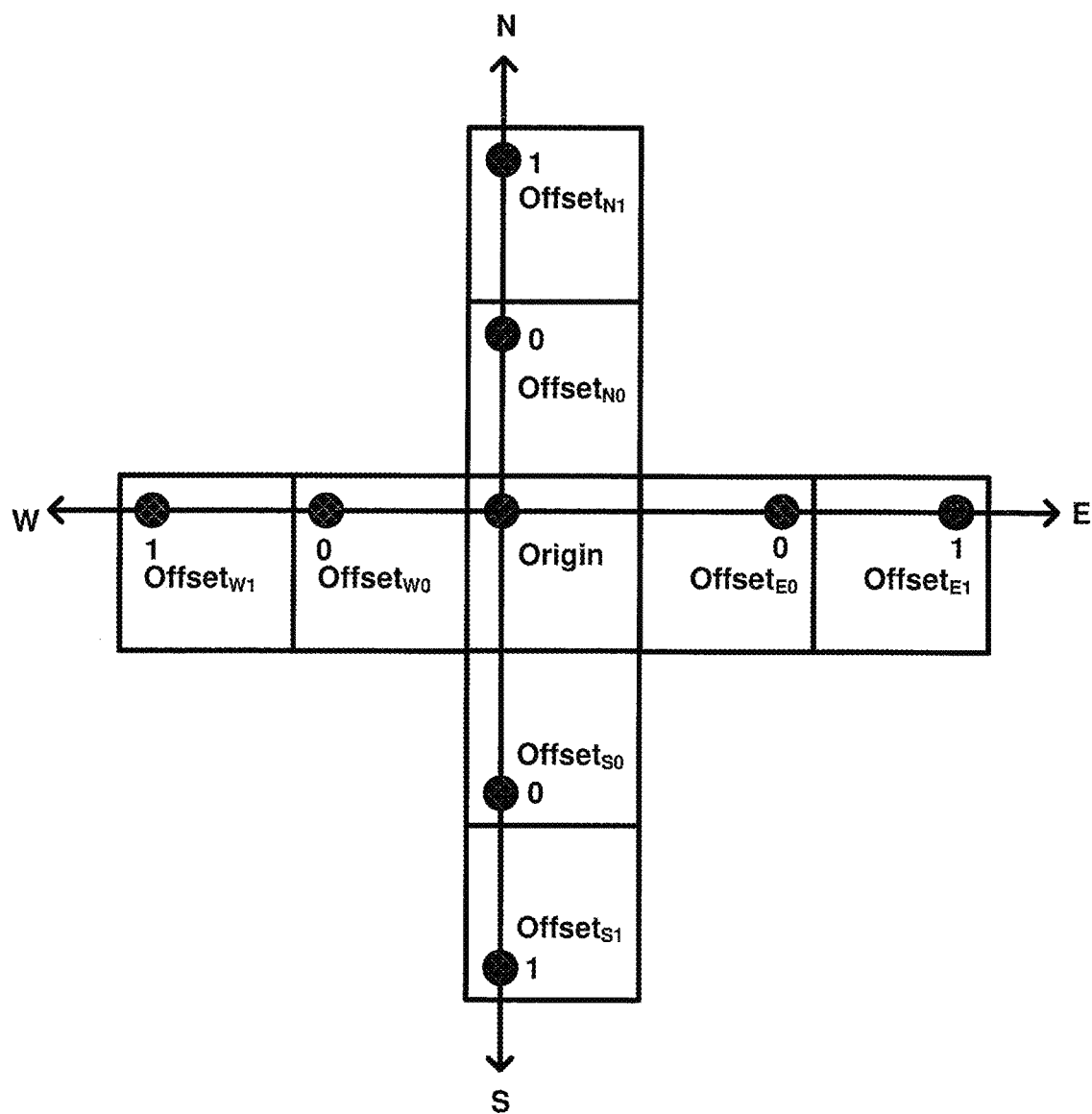
FIG. 10 is a conceptual diagram illustrating a sampling map according to one or more techniques of this disclosure.

FIG. 10 is a conceptual diagram illustrating a motion vector predictor origin and a sampling map according to one or more techniques of this disclosure. As described above, a motion vector predictor origin has association motion information and a sampling map serves to identify sampling points having corresponding offset values. As illustrated in FIG. 10, an origin is defined and sample points on the sampling map are specified with respect to the origin using directions (i.e., North, West, East, and South) and unit distances (i.e., 0, 1). Table 3 illustrates an example of offsets that correspond to each sampling point on the sampling map in FIG. 10. As described above, an offset that may be used to modify the motion vector corresponding to the origin. For example, if the associated motion vector of the origin is equal (10, 20) sampling point North 1 may be added to the motion information to a motion vector predictor (10, 24). In one example, for a current PB, the motion vector predictor (10, 24) may be inherited to generate a prediction. In one example, for a current PB, a delta value may be added to the motion vector predictor (10, 24) to generate a prediction.

TABLE 3

|   | East | North | West | South |
|---|------|-------|------|-------|
| 0 | (+2, 0) | (0, +2) | (−2, 0) | (0, −2) |
| 1 | (+4, 0) | (0, +4) | (−4, 0) | (0, −4) |

Figure 11:
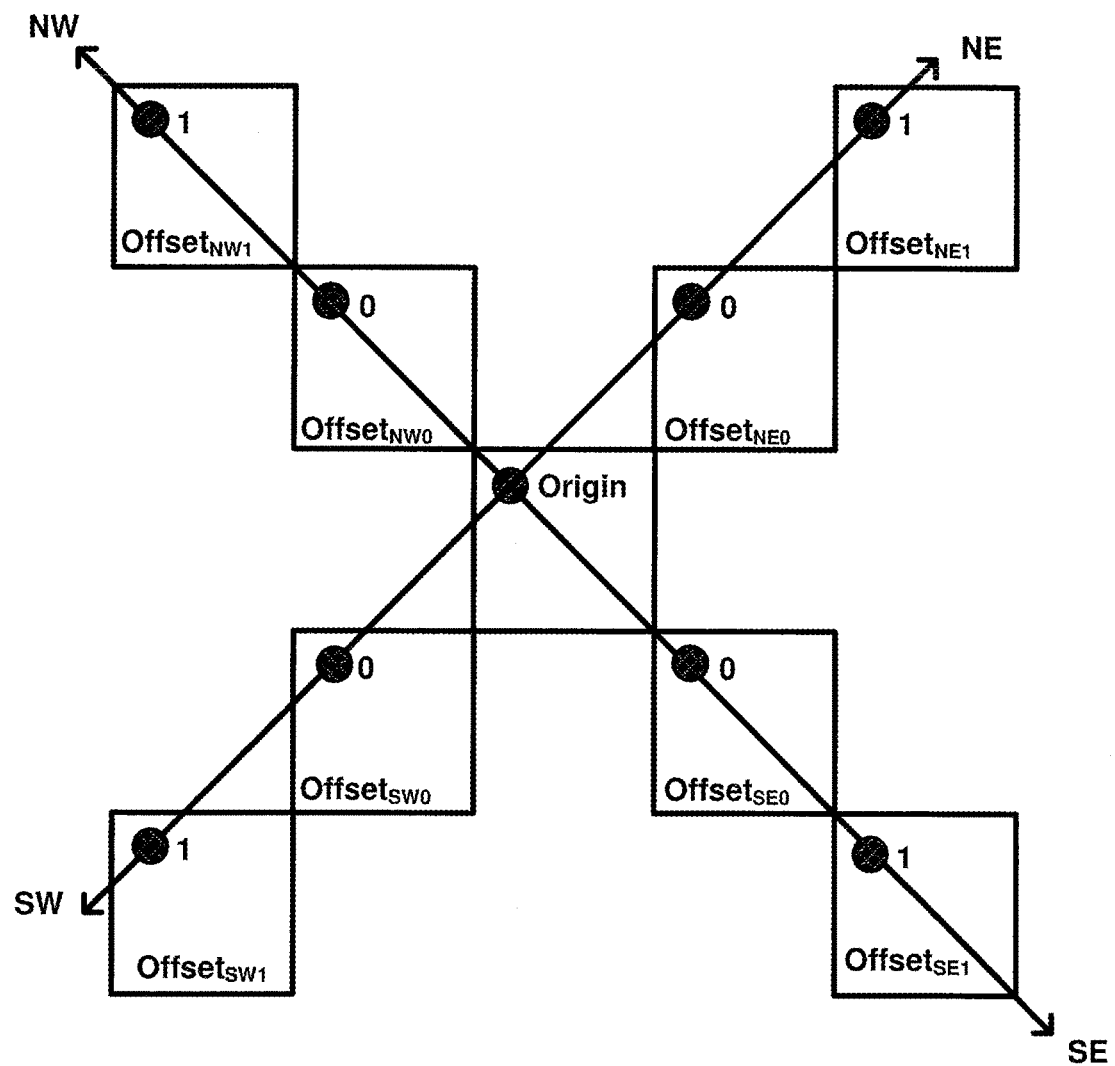
FIG. 11 is a conceptual diagram illustrating a sampling map according to one or more techniques of this disclosure.

It should be noted that the example conventions used to specify directions and distances illustrated in FIG. 10 should not be construed to limit the scope of the techniques described herein. For example, in other examples, other conventions may be used to indicate direction (e.g., radians, degrees, etc.). Further, in some examples, densities of sampling points at each direction may not be uniform. It should be noted that in some examples, signaling of sampling maps having arbitrary directions and densities may be enabled. In some cases, sampling maps may be classified as having a defined shape indicating directions and/or densities. For example, each of the sampling maps in FIG. 10 and FIG. 11 may be classified as rectangular shapes and the sampling map illustrated in FIG. 10 may be sub-classified as a plus-shape sampling map and the sampling map illustrated in FIG. 11 may be sub-classified as having a X-shape sampling map. Table 4 illustrates an example of offsets that correspond to each sampling point on the sampling map in FIG. 11.

TABLE 4

|   | NE | NW | SW | SE |
|---|----|----|----|----|
| 0 | (+2, +2) | (−2, +2) | (−2, −2) | (+2, −2) |
| 1 | (+4, +4) | (−4, +4) | (−4, −4) | (+2, −4) |

Another possible shape classification may include a diamond classification, where density about one axis is greater than density about another axis. For example, the North/South axis includes four sampling points and the East/West axis includes 8 sampling points. As described in further detail below, classifying sampling maps according to defined shapes may be useful in signaling sampling maps to a video decoder and thus, identifying a motion vector predictor. For example, a one-bit flag may be used to indicate one of a rectangular sampling map and a diamond sampling map. Further, as described in further detail, a starting angle value may be used for sub-classifying shapes. For example, a starting angle of 0 may indicate the plus-shape and a starting angle of 45 degrees may indicate the X-shape. It should be noted that the plus-shape sampling map in FIG. 10 and the X-shape sampling map in FIG. 11 have the same number of directions and density at each direction. In this case, a common syntax may be used to specify a direction and a sampling (e.g., a two-bit syntax element for each) for indicating a sampling point for each of the sampling maps. In other examples, sampling maps having different shapes may have different densities of directions (2, 4, 6, 8 directions, etc.) and densities at each direction (e.g., 2, 4, etc.). In such cases, syntax used to specify a direction and a unit distance may be conditioned on an indicated sampling map. It should be noted that in other examples, mathematic formulas may be used to define a sampling map. Further, it should be noted that in some examples, predefined sampling maps (or components thereof) may be indexed according to one or more lookup tables.

In some examples, according to the techniques described herein, offsets corresponding to a sampling point may be based on the context of a current video block. For example, if the motion vectors of neighboring video blocks have relatively large values and/or a relatively large value, it may be useful to increase the values offsets that may be used to modify the motion information associated with motion vector prediction origin. For example, in the case where the associated motion vector of the motion vector origin is equal (10, 20), it may be useful to scale the offset values in order to generate a motion vector prediction having a larger value and thus, increase the quality of the motion vector prediction. Table 5 illustrates an example where each of the offsets illustrated in the example of Table 3 are dependent on one of a first condition (Cond. 1) or a second condition (Cond. 2) being satisfied. For example, the first condition could be satisfied if the magnitude of the motion vector of a neighboring video block is less than a threshold and the second condition could be satisfied if the magnitude of the neighboring motion vector is less than or equal to the threshold.

TABLE 5

| | East | | North | | West | | South | |
|---|---|---|---|---|---|---|---|---|
| | Cond. 1 | Cond. 2 | Cond. 1 | Cond. 2 | Cond. 1 | Cond. 2 | Cond. 1 | Cond. 2 |
| 0 | (+2, 0) | (+8, 0) | (0, +2) | (0, +8) | (−2, 0) | (−8, 0) | (0, −2) | (0, −8) |
| 1 | (+4, 0) | (+16, 0) | (0, +4) | (0, +16) | (−4, 0) | (−16, 0) | (0, −4) | (0, −16) |

According to the techniques described herein, offsets corresponding to a sampling point may be based on one or more of the following: CU/PU size (width and height), picture order count (POC) distance between the current slice and the reference slice, adjacent motion vector or motion vector delta values, the variance of adjacent motion vectors and motion vector delta values, temporal depth, a partition depth, slice type (P or B), inter-prediction type (forward, backward, bi-prediction), a quantization parameter, the presence of decoder-side motion vector derivation tools (e.g. frame rate up-conversion (FRUC)), CU-level or PU-level coding, and accumulated statistics. In one example, the default values of offsets of a sampling map may be predefined (e.g., according to a video coding standard) or signaled in a parameter set, slice header, or supplemental message. In one example, an update of a sample map may be performed per coded video sequence (CVS), random access point, picture, slice, tile, CTU, CU, or PU. For example, in one example, the offsets included in Table 3 may represent default values for a picture that may be updated for each slice included in a picture. As described above, the current offsets for a slice may be scaled or modified based on the context of a current video block.

In one example, for each sampling point, a specific delta value (positive or negative) may be added to a current offset value based on the context of a current video block. The delta value may have different values according the sampling point position and one or more of the conditions described above. That is, a offset corresponding to a sample point may be based on a default value, an signaled updated value, and may be scaled and/or modified by a delta value based on the context of a current video block.

As described above, in some examples, video encoder 200 may be configured to signal sampling maps corresponding to motion vector predictor origins. In one example, video encoder 200 may be configured to signal sampling maps based on the following example syntax elements which may be included in relatively higher level syntax (e.g., parameter sets, such as, video parameter sets (VPS), sequence parameter sets (SPS), picture parameter sets (PPS), or slice headers):

presence_flag indicates the presence of mode_flag in the video block (e.g., a CU) syntax and the presence of syntax elements num_mv_origin, num_sampling_points, num_direction, starting_angle, num_sampling_dir, SM_shape and scale_from_sm_to_motion_distance in the higher level syntax (e.g., VPS, SPS, PPS or slice header) and indicates whether sample map based motion vector prediction is enabled in the current sequence, picture, or slice.

num_mv_origin indicates the number of motion vector origins. If not present, the value of this field is set equal to 0.

num_sampling_points indicates the total number of sampling points in a sampling map.

Note: For example, the sampling map in FIG. 10 includes 8 sampling points.

num_direction indicates the number of directions in a sampling map.

Note: For example, directions 0 (E), 90 (N), 180 (W), and 270 (S) may be used when num_direction is equal to 4 and directions 0 (E), 45 (NE), 90 (N), 135 (NW), 180 (W), 225 (SW), 270 (S), and 315 (SE) are used with num_direction equal to 8. In some examples, the number of directions may be specified according to the function: number of directions equals $2^{num\_direction}$.

Note: According to the boundary of picture, slice, tile, search range, or the context of spatio-temporal neighboring motion vectors, some directions may not be available. Then, the sampling points will be present only in available directions.

starting_angle indicates the angle of the first direction in degrees. The angle value increases in counterclockwise from the East direction. The value of this field shall be equal to or greater than 0 and shall be equal to or smaller than 360. If not present, the value of this field is set equal to 0.

num_sampling_dir indicates the number of sampling points per direction in a sampling map.

SM_shape indicates the shape of a sampling map. SM_shape equal to 0 indicates the rectangular shape, SM_shape equal to 1 indicates the diamond shape. The actual sampling point maps are determined by the combination of num_direction, num_sampling_dir, starting_angle and SM_shape.

Note: For example, SM_shape equal to 0, num_direction equal to 4 and starting_angle equal to 0 may indicate the plus-shape described above, while SM_shape equal to 0, num_direction equal to 4 and starting_angle equal to 45 may indicate the X-shape, described above.

scale_from_pdf_to_motion_distance indicates the scaling factor to convert sm_distance to the motion vector distance in image domain. If not present, the value of this field is set equal to 1.

and the following syntax elements which may be included in relatively lower level syntax (e.g., CU syntax):

mode_flag indicates the presence of origin_index, sm_direction, sm_distance, and indicates the use of sample map based motion vector prediction.

Note: in some examples, mode_flag can be located after skip_flag, when skip_flag is equal to 1.

origin_index indicates which of the derived motion vector predictor origins is used as the motion vector prediction origin for the current video block (e.g., CB, CU, PU, PB).

sm_direction indicates which direction is selected for the sampling point for the current video block.

Note: In some examples, sm_direction can be binarized into multiple flags, which indicate North/South, West/East, Diagonal, for example.

sm_distance indicates which distance from the origin is selected for the sampling point for the current video block.

to indicate the selected motion vector predictor origin and its associated motion information, the selected sampling point and its corresponding offset values. As described above, motion information associated with selected motion vector prediction origin and an offset value corresponding to a selected sampling point may be used for motion vector prediction.

It should be noted that sm_distance in some examples, indicates the perceptual index to determine the distance of the sampled point from the origin. The actual distance in pixel resolution can be derived from the following process:

MV_distance=PDF[sm_distance]*scale_from_pdf_to_motion_distance

PDF[x] converts the perceptual distance indicated by sm_distance to the actual distance in pixel domain.

PDF[x] can be pre-defined or can be signaled in VPS/SPS/PPS/sliceheader.

PDF[x] can be updated at each CTU/CU.

Each origin of a CU may have a different PDF[x] according to the contexts including CU/PU size (width and height), POC distance between the current slice and the reference slice, adjacent MVs or MVD values, variance of adjacent MVs and MVD values, temporal depth in a hierarchical B structure, QT, BT, or QTBT combined depth, slice type (P or B), inter-prediction type (forward, backward, bi-prediction), quantization parameter, the presence of decoder-side motion vector derivation tools (e.g. FRUC), CU-level or PU-level coding, and accumulated statistics. If the sampling point is determined by the above syntax elements and PDF[x], the motion vector X and Y values are determined. The values of the inter_pred_idc, which indicates the direction of inter-prediction (e.g. forward, backward, or bidirectional prediction), ref_idx_lx, which indicates the reference picture index, may be set equal to the values of the origin vectors.

Thus, in one example, a motion vector prediction formed by adding an offset associated sampling point North 1 in FIG. 10 to the motion information associated with PBB2 in FIG. 9 may be signaled as follows:

presence_flag indicates TRUE num_mv_origin indicates a number that includes $PB_{B2}$ in the derived set of motion vector predictor origins.

num_sampling_points indicates 8 sampling points.

num_direction indicates 4 (i.e., directions 0 (E), 90 (N), 180 (W), and 270 (S) OR 45 (NE), 135 (NW), 225 (SW), and 315 (SE) based on shape).

starting_angle indicates 0 to distinguish plus shape from x-shape.

num_sampling_dir indicates 2 sampling points (i.e., 0 or 1)

SM_shape indicates rectangle.

mode_flag indicates TRUE.

origin_index indicates PBB2.

sm_direction indicates N from N, W, S, and E.

sm_distance indicates from 1 in FIG. 10.

It should be noted that, in some examples, for each motion vector predictor origin, a different point distribution function (PDF) can be defined as follows:

```
PDF[10] = {1, 2, 4, 8, 12, 16, 24, 32, 48, 64}
if (sm_direction == 0)
{
   Motion vector X = PDF[sm_distance]*
      scale_from_pdf_to_motion_distance
   Motion vector Y = 0
}
else if (sm_direction == 1)
{
   Motion vector X = 0
   Motion vector Y = PDF[sm_distance] *
      scale_from_pdf_to_motion_distance
}
else if (sm_direction == 2)
{
   Motion vector X = − PDF[sm_distance] *
      scale_from_pdf_to_motion_distance
   Motion vector Y = 0
}
else
{
   Motion vector X = 0
   Motion vector Y = − PDF[sm_distance] *
      scale_from_pdf_to_motion_distance
}
```

Note:
Motion vector X and Motion vector Y may be clipped to not be located out of search range.

Figure 12:
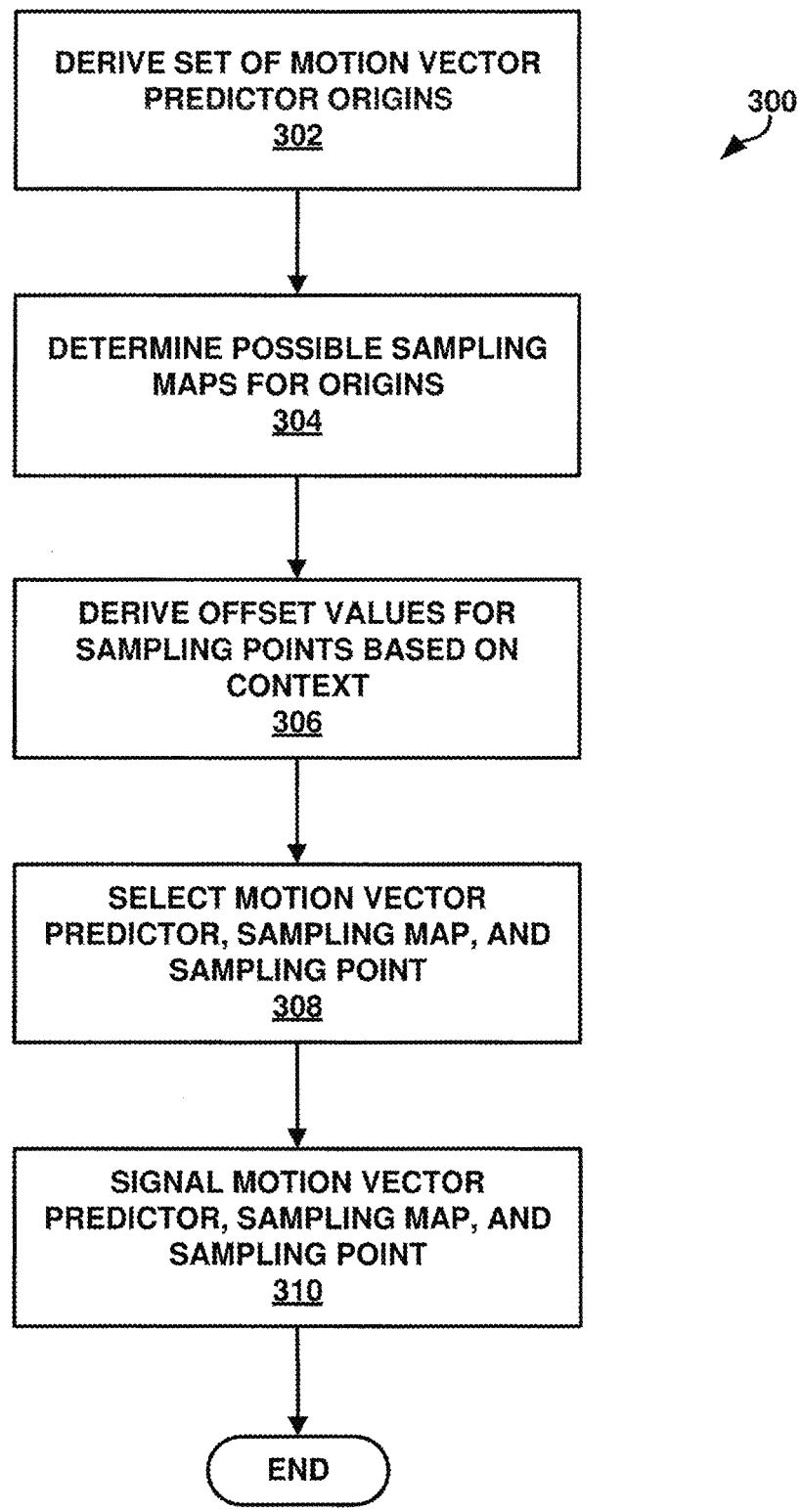
FIG. 12 is a flowchart illustrating a process for motion vector prediction using motion vector predictor origins and sampling maps according to one or more techniques of this disclosure.

It should be noted that the example syntax elements described above define the possible sampling maps that are enabled be signaled. Thus, a video encoder may use the syntax elements to determine the possible sampling maps that may be signaled. FIG. 12 is a flowchart illustrating a process for motion vector prediction using motion vector predictor origins and sampling maps according to one or more techniques of this disclosure. Video encoder 200 may be configured to perform motion vector prediction based on the example process 300 illustrated in FIG. 12. Video encoder 200 derives a set of motion vector predictor origins (302). As described above, a set of motion vector predictor origins may be derived in a similar manner as that of deriving a set of motion vector predictor candidates. Video encoder 200 determines the possible sampling maps for the origins (304). As described above, syntax elements define the possible sampling maps that are enabled be signaled. Video encoder 200 derives offset values for sampling points based on context (306). For example, as described above, video encoder 200 may modify a current offset value based on one or more conditions being satisfied. Video encoder 200 selects a motion vector predictor origin, a sampling map, and a sampling point (308). Video encoder 200 signals the selected motion vector predictor origin, the selected sampling map, and the selected sampling point (310). That is, as described in the example above, video encoder 200 sets values of syntax elements included in a bitstream to indicate the motion vector prediction. In this manner video encoder 200 represents an example of a device configured to determine a selected motion vector predictor origin for a current video block, determine a sampling map for the motion vector predictor origin, derive offset values corresponding to sampling points on the sampling map, determine a selected sampling point, determine a motion vector predictor based at least in part on motion information associated with the selected motion vector predictor origin and the offset values corresponding to the selected sampling point, and generate a prediction for the current video block using the determined motion vector predictor.

It should be noted that based on the example syntax above, after origin_index is signaled, additional syntax elements sm_direction and sm_distance may indicates one of several possible offset values depending on the context conditions imposed to determine offset values. In example, two bits may be used to indicate a direction value and one bit may be used to indicate one of unit distances 0 or 1. Thus, in this example, according to the techniques described herein, once an motion vector prediction origin is indicated, 3-bits in signaling overhead may be used to modify motion information associated with the motion vector predictor may be used to indicate various motion vector predictor values.

As described above, ITU-T H.265 includes techniques for removing redundant motion vector predictor candidates from the set of candidates. In ITU-T H.265, the source of redundancy of motion vector predictor candidates is motion information, i.e., two candidates have motion vectors which are equal. As described above, according to the techniques described herein, each motion vector prediction origin includes associated motion information, a sampling map may be defined for each motion vector predictor origin, and a sampling map may be modified based on context. Thus, depending on sampling maps and context, if two motion vector predictor origins include motion vectors that are relatively close, when offsets corresponding to sampling points of the respective sampling maps are applied to the respect motion vectors of the motion vector predictor origins, redundancies may result. For example, Table 6 illustrates an example, where the motion vector of a first motion vector predictor (MVP Origin1) is (10, 20) and the motion vector of a second motion vector predictor (MVP Origin2) is (22,20). In the example illustrated in Table 6, the offsets for the first motion vector predictor origin correspond to the example illustrated in Table 3 when the first condition is satisfied and the offsets for the second motion vector predictor origin correspond to the example illustrated in Table 3 when the second condition is satisfied. Each entry in Table 6 includes a resulting motion vector predictor value.

As illustrated in Table 6, some of the entries are redundant. For example, the motion vector predictors resulting from the sampling points for the West direction of the second motion vector prediction origin (i.e., (14, 20) and (6, 20)) can be indicated using sampling points for the first motion vector predictor (East 1 and West 1). According to the techniques herein, when motion vector predictor origins result in motion vector predictors, or are likely to result in motion vector predictor origins that is redundant, motion vector prediction origins, motion information associated therewith, and/or sampling maps may be modified. It should be noted that a video encoder and a video decoder may be perform the same process for determining whether motion vector predictor origins are likely to result in redundant motion vector predictors and thus, perform that same processes for mitigating redundancy.

In one example, a determination of whether motion vector predictor origins are likely to result in motion vector predictors that are redundant may be based on a component of respective motion vectors being equal (e.g., if x1=x2 or y1=y2) and/or one or more components of respective motion vectors being relatively close in value (e.g., x1-x2 is less than or equal to a threshold, where a threshold equals 4, 8, 16, etc.). In one example, if motion vector predictor origins are likely to result in motion vector predictors that are redundant, one or more new sampling maps may be defined for each motion vector predictor origin. Table 7 illustrates an example where for the example corresponding to Table 6, a new joint sampling map is defined and applied to each of the first motion vector predictor origin and the second motion vector predictor origin. In the example illustrated in Table 7, new offset values are generated by averaging offset values at each sampling point. In other examples, other techniques may be used for generating new and/or joint sampling maps. For example, the offset values for one or more directions of the sampling map for the second motion vector predictor origin may be shifted (e.g., +10 for each vertical offset).

TABLE 6

| MVP Origin$_1$ (10, 20) | | | | |
| --- | --- | --- | --- | --- |
| | East (+2, 0):(+4, 0) | North (0, +2):(0, +4) | West (−2, 0):(−4, 0) | South(0, −2):(0, −4) |
| 0 | (12, 20) | (10, 22) | (8, 20) | (10, 18) |
| 1 | (14, 20) | (10, 24) | (6, 20) | (10, 16) |
| MVP Origin$_2$ (22, 20) | | | | |
| | East (+8, 0):(+16, 0) | North (0, +8):(0, +16) | West (−8, 0):(−16, 0) | South(0, −8):(0, −16) |
| 0 | (30, 20) | (22, 28) | (14, 20) | (22, 12) |
| 1 | (38, 20) | (22, 36) | (6, 20) | (22, 4) |

TABLE 7

| | MVP Origin₁ (10, 20) | | | |
|---|---|---|---|---|
| | East(+5, 0):(+10, 0) | North (0, +5):(0, +10) | West (−5, 0):(−10, 0) | South(0, −5):(0, −10) |
| 0 | (15, 20) | (10, 25) | (5, 20) | (10, 15) |
| 1 | (20, 20) | (10, 30) | (0, 20) | (10, 10) |

| | MVP Origin₂ (22, 20) | | | |
|---|---|---|---|---|
| | East (+5, 0):(+10, 0) | North (0, +5):(0, +10) | West (−5, 0):(−10, 0) | South(0, −5):(0, −10) |
| 0 | (25, 20) | (22, 25) | (17, 20) | (22, 15) |
| 1 | (30, 20) | (22, 30) | (12, 20) | (22, 10) |

In one example, if motion vector predictor origins are likely to result in motion vector predictor that are redundant, motion information of one of the MVP origins may be modified. Table 8 illustrates an example where for the example corresponding to Table 6, motion information associated with the second motion vector predictor origin is modified.

TABLE 8

| | MVP Origin₁ (10, 20) | | | |
|---|---|---|---|---|
| | East (+2, 0):(+4, 0) | North (0, +2):(0, +4) | West (−2, 0):(−4, 0) | South(0, −2):(0, −4) |
| 0 | (12, 20) | (10, 22) | (8, 20) | (10, 18) |
| 1 | (14, 20) | (10, 24) | (6, 20) | (10, 16) |

| | MVP Origin₂* (22, 25) | | | |
|---|---|---|---|---|
| | East (+8, 0):(+16, 0) | North (0, +8):(0, +16) | West(−8, 0):(−16, 0) | South(0, −8):(0, −16) |
| 0 | (30, 25) | (22, 33) | (14, 25) | (22, 17) |
| 1 | (38, 25) | (22, 41) | (6, 25) | (22, 9) |

In one example, according to the techniques herein, when motion vector predictor origins result in motion vector predictors or are likely to result in motion vector predictors that are redundant, a motion vector predictor origin may be removed from a candidate set of motion vector predictor origins according to a pruning process. For example, in a pruning process similar to that described above with respect to ITU-T H.265. In one example, new motion vector predictor origin candidates may be added to a candidate set. For example, the example illustrated in Table 8 may correspond to an example, where the second motion vector predictor origin is removed and replaced with a new motion vector predictor candidate. In one example, a new candidate may be the next motion vector predictor origin candidate according to a candidate derivation process. In one example, a new motion vector predictor origin candidate may be derived from a combination of motion vector predictor origin candidates.

In one example, if motion vector predictor origins are likely to result in motion vector predictors that are redundant, motion information of motion vector origins may be combined and/or one or more new sampling maps may be defined for each motion vector predictor origin. Table 9 illustrates an example where for the example corresponding to Table 6, new motion information is created by combining the motion information of the first motion vector predictor origin and the second motion vector predictor origin and a new joint sampling map is defined and applied to the new motion information.

TABLE 9

| | MVP Origin* (16, 20) | | | |
|---|---|---|---|---|
| | East (+5, 0):(+10, 0) | North (0, +5):(0, +10) | West (−5, 0):(−10, 0) | South(0, −5):(0, −10) |
| 0 | (21, 20) | (16, 25) | (11, 20) | (16, 15) |
| 1 | (26, 20) | (16, 30) | (6, 20) | (16, 10) |

In one example, if motion vector predictor origins are likely to result in motion vector predictors that are redundant, a motion vector predictor origin may be removed from a candidate set of motion vector predictor origins and the sampling map of the motion vector predictor origin that is not removed may be expanded to include the sampling map of the motion vector predictor origin that was removed. Table 10 illustrates an example where for the example corresponding to Table 6, the second motion vector predictor origin is removed and the sampling map of the first motion vector predictor origin is expanded to include the sampling points of the sampling map corresponding to the second motion vector predictor origin.

TABLE 10

| MVP Origin$_1$ (10, 20) | | | |
|---|---|---|---|
| East (+2, 0):(+4, 0) | North (0, +2):(0, +4) | West (−2, 0):(−4, 0) | South(0, −2):(0, −4) |
| 0 | (12, 20) | (10, 22) | (8, 20) | (10, 18) |
| 1 | (14, 20) | (10, 24) | (6, 20) | (10, 16) |
| MVP Origin$_1$ (10, 20) | | | |
| East (+8, 0):(+16, 0) | North (0, +8):(0, +16) | West (−8, 0):(−16, 0) | South(0, −8):(0, −16) |
| 0 | (18, 20) | (10, 28) | (2, 20) | (10, 12) |
| 1 | (26, 20) | (10, 36) | (−6, 20) | (10, 4) |

In one example, if motion vector predictor origins are likely to result in motion vector predictors that are redundant, the motion vector predictor origin may be combined and both sampling maps may be applied to the combined motion vector predictor origin. Table 11 illustrates an example where for the example corresponding to Table 6, the motion vector predictors are combined and the sampling maps are combined.

TABLE 11

| MVP Origin* (16, 20) | | | |
|---|---|---|---|
| East (+2, 0):(+4, 0) | North (0, +2):(0, +4) | West (−2, 0):(−4, 0) | South(0, −2):(0, −4) |
| 0 | (18, 20) | (16, 22) | (14, 20) | (16, 18) |
| 1 | (20, 20) | (16, 24) | (12, 20) | (16, 16) |
| MVP Origin* (16, 20) | | | |
| East (+8, 0):(+16, 0) | North (0, +8):(0, +16) | West (−8, 0):(−16, 0) | South(0, −8):(0, −16) |
| 0 | (24, 20) | (16, 28) | (8, 20) | (16, 12) |
| 1 | (32, 20) | (16, 36) | (0, 20) | (16, 4) |

As described above, a PDF converts the perceptual distance to the actual distance in pixel domain. In one example, when two or more motion vector predictor origins are combined, the PDF of the combined motion vector predictor can be determined by the combination of the PDF of each motion vector predictor origin. For example, if the first and second motion vector predictor origins have the following PDF values:

PDF$_1$[10]={1,2,4,8,12,16,24,32,48,64}

PDF$_2$[10]={2,4,8,12,16,24,32,48,64,80} the PDF of the combined motion vector predictor origin may have the following PDF values;

PDF$_{1+2}$[10]={3,6,12,20,28,40,56,80,112,144}.

In one example, offset values can be scaled according to picture order count (POC) distance between the current frame and a reference frame. For example, in the case where an offset value is equal to X when the POC distance is equal to 1, if the POC distance of another reference frame is equal to 4, then the offset value may be scaled to 4X. Further in the case of a bidirectional prediction, if the offset value is equal to X for the forward prediction, then the offset value for the backward prediction may have −X (e.g., when the absolute distance is same).

Referring again to FIG. 8, as illustrated in FIG. 8, inter prediction processing unit 214 may receive reconstructed video block via filter unit 216, which may be part of an in-loop filtering process. Filter unit 216 may be configured to perform deblocking and/or Sample Adaptive Offset (SAO) filtering. Deblocking refers to the process of smoothing the boundaries of reconstructed video blocks (e.g., make boundaries less perceptible to a viewer). SAO filtering is a non-linear amplitude mapping that may be used to improve reconstruction by adding an offset to reconstructed video data. Entropy encoding unit 218 receives quantized transform coefficients and predictive syntax data (i.e., intra prediction data, motion prediction data, QP data, etc.). Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom.

Figure 13:
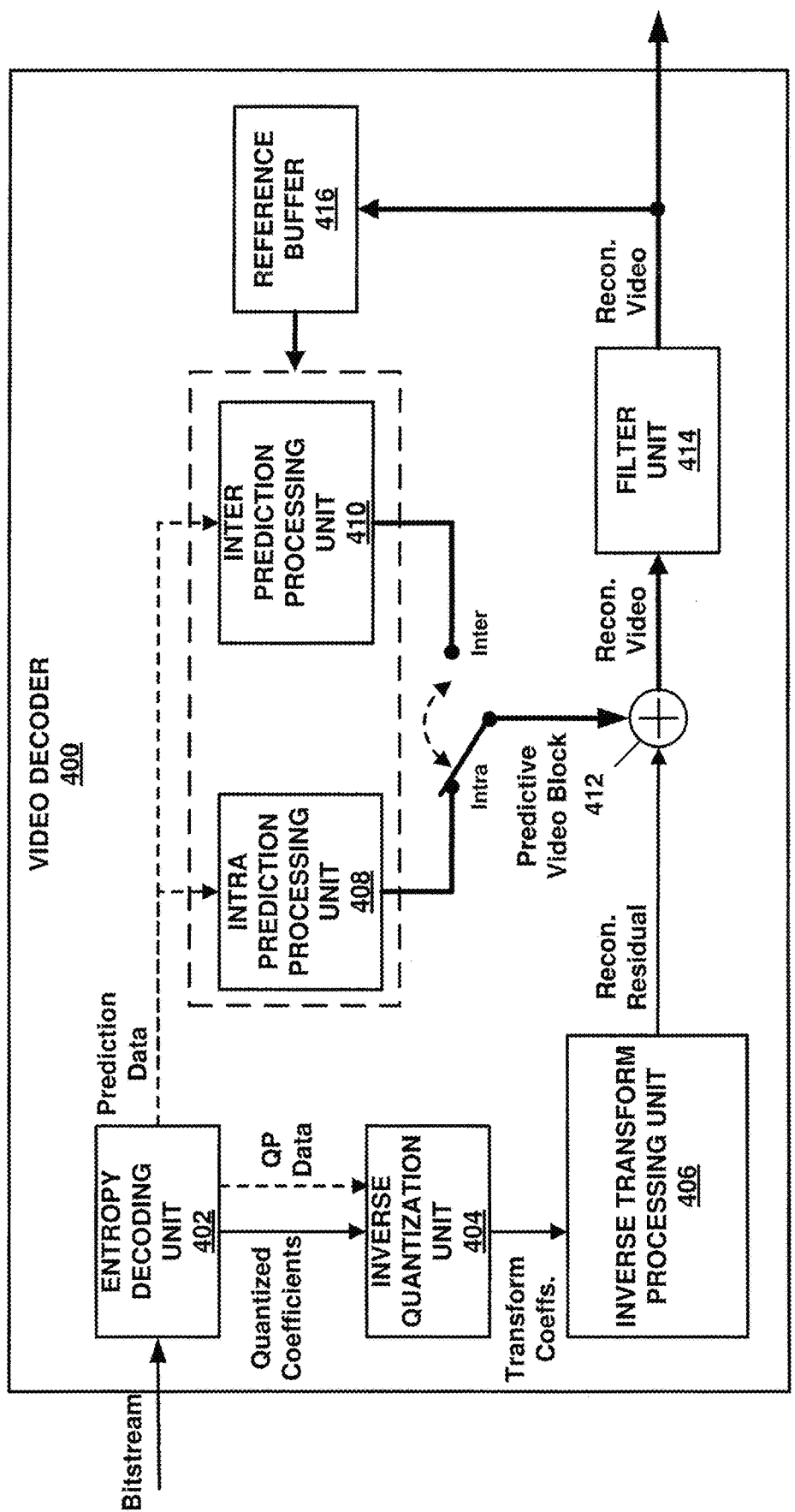
FIG. 13 is a block diagram illustrating an example of a video decoder that may be configured to decode video data according to one or more techniques of this disclosure.

FIG. 13 is a block diagram illustrating an example of a video decoder that may be configured to decode video data according to one or more techniques of this disclosure. In one example, video decoder 400 may be configured to reconstruct video data based on one or more of the techniques described above. That is, video decoder 400 may operate in a reciprocal manner to video encoder 200 described above. Video decoder 400 may be configured to perform intra prediction decoding and inter prediction decoding and, as such, may be referred to as a hybrid decoder. In the example illustrated in FIG. 13 video decoder 400 includes an entropy decoding unit 402, inverse quantization unit 404, inverse transformation processing unit 406, intra prediction processing unit 408, inter prediction processing unit 410, summer 412, filter unit 414, and reference buffer 416. Video decoder 400 may be configured to decode video data in a manner consistent with a video encoding system, which may implement one or more aspects of a video coding standard. It should be noted that although example video decoder 400 is illustrated as having distinct functional blocks, such an illustration is for descriptive purposes and does not limit video decoder 400 and/or sub-components thereof to a particular hardware or software architecture. Functions of video decoder 400 may be realized using any combination of hardware, firmware, and/or software implementations.

As illustrated in FIG. 13, entropy decoding unit 402 receives an entropy encoded bitstream. Entropy decoding unit 402 may be configured to decode quantized syntax elements and quantized coefficients from the bitstream according to a process reciprocal to an entropy encoding process. Entropy decoding unit 402 may be configured to perform entropy decoding according any of the entropy coding techniques described above. Entropy decoding unit 402 may parse an encoded bitstream in a manner consistent with a video coding standard. Video decoder 400 may be configured to parse an encoded bitstream where the encoded bitstream is generated based on the techniques described above. Inverse quantization unit 404 receives quantized transform coefficients (i.e., level values) and quantization parameter data from entropy decoding unit 402. Quantization parameter data may include any and all combinations of delta QP values and/or quantization group size values and the like described above. Video decoder 400 and/or inverse quantization unit 404 may be configured to determine QP values used for inverse quantization based on values signaled by a video encoder and/or through video properties and/or coding parameters. That is, inverse quantization unit 404 may operate in a reciprocal manner to coefficient quantization unit 206 described above. Inverse quantization unit 404 may be configured to apply an inverse quantization. Inverse transform processing unit 406 may be configured to perform an inverse transformation to generate reconstructed residual data. The techniques respectively performed by inverse quantization unit 404 and inverse transform processing unit 406 may be similar to techniques performed by inverse quantization/transform processing unit 208 described above. Inverse transform processing unit 406 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 13, reconstructed residual data may be provided to summer 412. Summer 412 may add reconstructed residual data to a predictive video block and generate reconstructed video data.

As describe above, a predictive video block may be determined according to a predictive video technique (i.e., intra prediction and inter frame prediction). Intra prediction processing unit 408 may be configured to receive intra prediction syntax elements and retrieve a predictive video block from reference buffer 416. Reference buffer 416 may include a memory device configured to store one or more frames of video data. Intra prediction syntax elements may identify an intra prediction mode, such as the intra prediction modes described above. In one example, intra prediction processing unit 408 may reconstruct a video block using according to one or more of the intra prediction coding techniques described herein. Inter prediction processing unit 410 may receive inter prediction syntax elements and generate motion vectors to identify a prediction block in one or more reference frames stored in reference buffer 416. Inter prediction processing unit 410 may produce motion compensated blocks, possibly performing interpolation based on interpolation filters. Identifiers for interpolation filters to be used for motion estimation with sub-pixel precision may be included in the syntax elements. Inter prediction processing unit 410 may use interpolation filters to calculate interpolated values for sub-integer pixels of a reference block.

Figure 14:
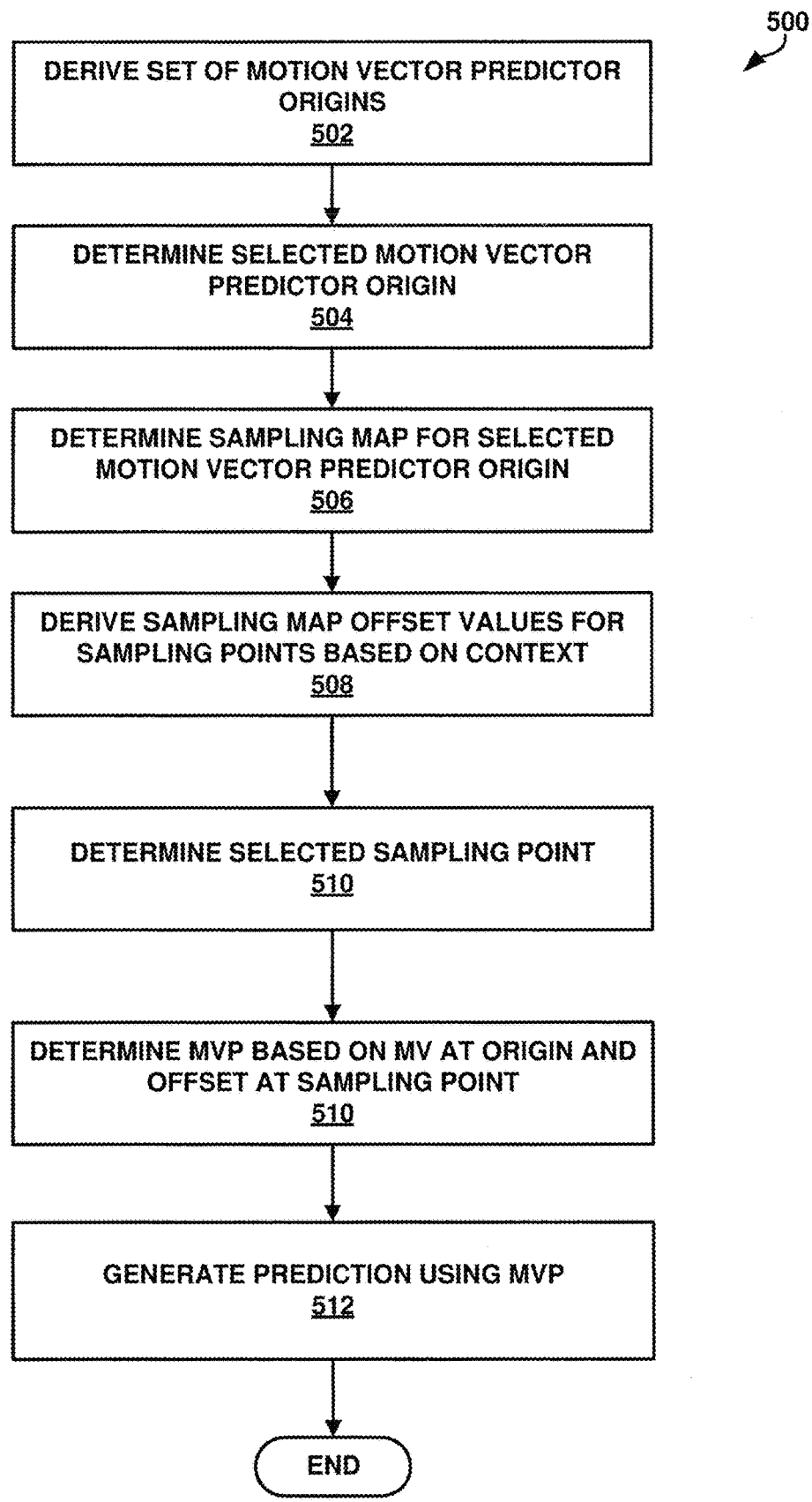
FIG. 14 is a flowchart illustrating a process for motion vector prediction using motion vector predictor origins and sampling maps according to one or more techniques of this disclosure.

As described above, video decoder 400 may parse an encoded bitstream where the encoded bitstream is generated based on the techniques described above and as described above video encoder 200 may generate a bitstream according to the motion vector prediction techniques described above. FIG. 14 is a flowchart illustrating a process for motion vector prediction using motion vector predictor origins and sampling maps according to one or more techniques of this disclosure. Video decoder 400 may be configured to perform motion vector prediction based on the example process 500 illustrated in FIG. 14. Video decoder 400 derives a set of motion vector predictor origins (502). As described above, a set of motion vector predictor origins may be derived in a similar manner as that of deriving a set of motion vector predictor candidates. Video decoder 400 determines the selected motion vector predictor origin (504). For example, video decoder 400 may determine a selected motion vector predictor origin based on the value of a syntax element similar to the example syntax element origin_index described above. Video decoder 400 determines a sampling map for the selected motion vector predictor origin (506). For example, video decoder 400 may determine a sampling map based on the values of syntax elements similar to the example syntax elements, num_sampling_points, num_direction, num_sampling_dir and SM_shape described above. Video decoder 400 derives offset values for sampling points based on context (508). For example, as described above, video decoder 300 may modify a current offset value based on one or more conditions being satisfied. Video decoder 400 determines a selected sampling point (508). For example, video decoder 400 may determine a selected sampling point based on the values of a syntax elements similar to the example syntax elements sm_direction and sm_distance described above. Video decoder 400 determines a motion vector prediction based on the motion vector associated with the selected motion vector predictor origin and the offset corresponding to the selected sampling point (510). For example, video decoder 400 may add the offset to the motion vector. Video decoder 400 generates a prediction using the selected candidate (512). For example, in one example, for a current video block video decoder 400 may use the motion vector predictor as the motion vector to generate a prediction. In one example, video decoder 400 may add a delta value to a motion vector predictor to generate a prediction. In this manner video encoder 200 represents an example of a device configured to determine a selected motion vector predictor origin for a current video block, determine a sampling map for the motion vector predictor origin, derive offset values corresponding to sampling points on the sampling map, determine a selected sampling point, determine a motion vector predictor based at least in part on motion information associated with the selected motion vector predictor origin and the offset values corresponding to the selected sampling point, and generate a prediction for the current video block using the determined motion vector predictor.

Referring again to FIG. 13, filter unit 414 may be configured to perform filtering on reconstructed video data. For example, filter unit 414 may be configured to perform deblocking and/or SAO filtering, as described above with respect to filter unit 216. Further, it should be noted that in some examples, filter unit 414 may be configured to perform proprietary discretionary filter (e.g., visual enhancements). As illustrated in FIG. 13 a reconstructed video block may be output by video decoder 400.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

The invention claimed is:
1. A method of deriving motion vector information for a coding block, the method including:
  deriving a candidate set for a merge mode, wherein the candidate set includes a first motion vector predictor candidate at a first position and a second motion vector predictor candidate at a second position;
  deriving a motion vector to be added to the candidate set by using a sum of the first motion vector predictor candidate and the second motion vector predictor candidate;
  receiving an index syntax element used for indicating a predetermined motion vector predictor candidate in the candidate set and used for deriving the motion vector information;
  receiving a distance index syntax element used to derive a distance in a set of distances;
  receiving a motion distance syntax element used to derive a motion distance;
  receiving a direction syntax element used to derive directions including a negative X direction, a positive X direction, a positive Y direction, or a negative Y direction;

deriving an offset value by using the direction syntax element and the motion distance; and deriving the motion vector information by modifying the motion vector by using the offset value, wherein the distance derived based on the distance index syntax element equal to a first value results in different values of the motion distance according to a value of the motion distance syntax element.

2. A device for deriving motion vector information for a coding block, the device comprising:

a processor, and a memory associated with the processor; wherein the processor is configured to:

derive a candidate set for a merge mode, wherein the candidate set includes a first motion vector predictor candidate at a first position and a second motion vector predictor candidate at a second position;

derive a motion vector to be added to the candidate set by using a sum of the first motion vector predictor candidate and the second motion vector predictor candidate;

receive an index syntax element used for indicating a predetermined motion vector predictor candidate in the candidate set and used for deriving the vector information;

receive a distance index syntax element used to derive a distance in a set of distances;

receive a motion distance syntax element used to derive a motion distance;

receive a direction syntax element used to derive directions including a negative X direction, a positive X direction, a positive Y direction, or a negative Y direction;

derive an offset value by using the direction syntax element and the motion distance; and derive the motion vector information by modifying the motion vector by using the offset value; wherein the distance derived based on the distance index syntax element equal to a first value results in a different values of the motion distance according to a value of the motion distance syntax element.

* * * * *